(12) United States Patent
Ehrenberg

(10) Patent No.: US 9,013,155 B2
(45) Date of Patent: Apr. 21, 2015

(54) ENERGY STORAGE DEVICES INCLUDING A SOLID MULTILAYER ELECTROLYTE

(75) Inventor: Scott G. Ehrenberg, Port Richey, FL (US)

(73) Assignee: Dais Analytic Corporation, Odessa, FL (US)

(*) Notice: Subject to any disclaimer, the term of this patent is extended or adjusted under 35 U.S.C. 154(b) by 55 days.

(21) Appl. No.: 13/544,436

(22) Filed: Jul. 9, 2012

(65) Prior Publication Data

US 2012/0320497 A1 Dec. 20, 2012

Related U.S. Application Data

(63) Continuation-in-part of application No. PCT/US2011/002051, filed on Jan. 7, 2011.

(60) Provisional application No. 61/596,541, filed on Feb. 8, 2012, provisional application No. 61/293,638, filed on Jan. 9, 2010.

(51) Int. Cl.
*H01G 9/15* (2006.01)
*H01G 5/38* (2006.01)
*H01G 11/32* (2013.01)
*H01G 11/56* (2013.01)
*H01G 11/30* (2013.01)

(52) U.S. Cl.
CPC ............ *H01G 11/32* (2013.01); *H01G 11/30* (2013.01); *H01G 11/56* (2013.01); *Y02E 60/13* (2013.01)

(58) Field of Classification Search
CPC ....... H01G 11/32; H01G 11/30; H01G 11/56; Y02E 60/13

USPC .......................................... 361/525; 320/167
See application file for complete search history.

(56) References Cited

U.S. PATENT DOCUMENTS

| | | | |
|---|---|---|---|
| 4,248,821 A | | 2/1981 | Van Dellen |
| 5,136,474 A | | 8/1992 | Sarangapani et al. |
| 5,239,010 A | | 8/1993 | Balas et al. |
| 5,468,574 A | | 11/1995 | Ehrenberg et al. |
| 5,637,421 A | * | 6/1997 | Poehler et al. ................ 429/303 |
| 5,677,074 A | | 10/1997 | Serpico et al. |

(Continued)

FOREIGN PATENT DOCUMENTS

| | | |
|---|---|---|
| CN | 1650463 A | 8/2005 |
| DE | 580366 | 7/1933 |

(Continued)

OTHER PUBLICATIONS

Gilbert, "The Reactions of Sulfur Trioxide, and of its Adducts, with Organic Compounds," *Chem. Rev.*, 1962; 62(6):549-589.

(Continued)

*Primary Examiner* — Jenny L Wagner
*Assistant Examiner* — Michael P McFadden
(74) *Attorney, Agent, or Firm* — Mueting, Raasch & Gebhardt, P.A.

(57) ABSTRACT

Energy storage devices that include a solid multilayer electrolyte are provided. In certain embodiments, the energy storage devices disclosed herein can exhibit behavior analogous to an electrochemical battery at lower voltages, but can transition to electrostatic capacitor behavior as voltages rise. The energy storage devices, methods, and systems disclosed herein can preferably be advantageous by providing a large total energy storage capacity.

14 Claims, 10 Drawing Sheets

(56) References Cited

U.S. PATENT DOCUMENTS

| | | | |
|---|---|---|---|
| 5,679,482 | A | 10/1997 | Ehrenberg et al. |
| 5,840,387 | A | 11/1998 | Berlowitz-Tarrant et al. |
| 6,110,616 | A | 8/2000 | Sheikh-Ali et al. |
| 6,383,391 | B1 | 5/2002 | Ehrenberg et al. |
| 6,396,682 | B1 | 5/2002 | Kim et al. |
| 6,413,298 | B1 | 7/2002 | Wnek et al. |
| 6,699,941 | B1 | 3/2004 | Handlin et al. |
| 6,841,601 | B2 | 1/2005 | Serpico et al. |
| 7,001,950 | B2 | 2/2006 | Handlin, Jr. et al. |
| 7,067,589 | B2 | 6/2006 | Bening et al. |
| 7,169,848 | B2 | 1/2007 | Bening et al. |
| 7,169,850 | B2 | 1/2007 | Handlin, Jr. et al. |
| 7,179,860 | B2 | 2/2007 | Cao et al. |
| 7,186,779 | B2 | 3/2007 | Joly et al. |
| 7,342,755 | B1 * | 3/2008 | Horvat et al. ............ 361/18 |
| 7,625,652 | B2 | 12/2009 | Uensal et al. |
| 7,990,679 | B2 | 8/2011 | Ehrenberg et al. |
| 2005/0154144 | A1 | 7/2005 | Atwood et al. |
| 2006/0130300 | A1 * | 6/2006 | Kobayashi et al. ........ 29/25.03 |
| 2007/0004830 | A1 | 1/2007 | Flood et al. |
| 2007/0015061 | A1 * | 1/2007 | Klaassen .................. 429/322 |
| 2007/0020473 | A1 | 1/2007 | Umana et al. |
| 2007/0021569 | A1 | 1/2007 | Willis et al. |
| 2007/0026251 | A1 | 2/2007 | Umana |
| 2007/0037927 | A1 | 2/2007 | Yang |
| 2007/0055015 | A1 | 3/2007 | Flood et al. |
| 2007/0230093 | A1 * | 10/2007 | Kobayashi ................ 361/540 |
| 2007/0285875 | A1 * | 12/2007 | Duff, Jr. .................. 361/502 |
| 2009/0123804 | A1 * | 5/2009 | Yamashita et al. ......... 429/33 |
| 2010/0002362 | A1 * | 1/2010 | Clelland et al. ........... 361/502 |

FOREIGN PATENT DOCUMENTS

| | | |
|---|---|---|
| JP | 2008159280 A | 7/2008 |
| JP | 5150095 B2 | 2/2013 |
| WO | WO 2011/085186 A2 | 7/2011 |
| WO | WO 2011/085197 A2 | 7/2011 |
| WO | WO 2011/085197 A3 | 11/2011 |

OTHER PUBLICATIONS

International Preliminary Report on Patentability and Written Opinion for PCT/US2011/020514 dated Jul. 10, 2012; 7 pgs.

Jenkins et al., "Glossary of Basic Terms in Polymer Science," *International Union of Pure and Applied Chemistry*, 1996; 68(12):2287-2311.

Pohl, "Giant Polarization in High Polymers," *Journal of Electronic Materials*, Jul. 1986; 15(4):201-203.

Ring et al., "Source-based Nomenclature for Copolymers," *International Union of Pure and Applied Chemistry*, 1985; 57:10:1427-1440.

U.S. Appl. No. 13/521,105, filed Jul. 9, 2012, Ehrenberg.

U.S. Appl. No. 61/596,535, filed Feb. 8, 2012, Ehrenberg.

* cited by examiner

Cationic Ionomer
Graphite Powder
12 μm thick Anode

Layered Electrolyte
Dielectric 12-25 um
thick

Anionic Ionomer
Carbon Nano-Powder
12 μm thick Cathode

Aluminum Layer
12 μm thick

Elastomer
Dielectric

ENERGY STORAGE DEVICES INCLUDING A SOLID MULTILAYER ELECTROLYTE

This application claims the benefit of U.S. Provisional Application No. 61/596,541, filed Feb. 8, 2012, and is a continuation-in-part of International Application No. PCT/US 2011/020514, filed Jan. 7, 2011 (pending), which claims the benefit of U.S. Provisional Application No. 61/293,638, filed Jan. 9, 2010, each of which are incorporated herein by reference in their entireties.

BACKGROUND

Electrical energy storage devices, such as capacitors, batteries, and ultracapacitors, store or create energy by utilizing the electric charge on two metal or otherwise electrically conductive surfaces ("electrodes"). The charge-bearing surfaces are typically separated by an electrical insulator, or dielectric. As charge is placed on the conductive surfaces, an electrical field is established between the electrodes, resulting in a voltage. Typically, a capacitor physically separates positive and negative charges, rather than chemically separating the charges, as is common in batteries. Batteries have limited ability to be recycled and cannot deliver energy as quickly as a capacitor, or without greater losses than occurs with capacitors.

A supercapacitor or ultracapacitor is sometimes called a double-layer capacitor, as it polarizes an electrolytic solution to store energy electrostatically. The energy storage mechanism of an ultracapacitor is highly reversible, which allows for the ultracapacitor to be charged and discharged many times.

However, capacitors typically have not been able to match the energy storage capability of batteries due to the lack of available materials and structures that can tolerate electric fields of sufficient strength.

SUMMARY

In one aspect, the present disclosure provides energy storage devices. In one embodiment, the energy storage device includes: an anode; a solid multilayer electrolyte including a plurality of layers including anionic exchange polymer electrolyte layers and cationic exchange polymer electrolyte layers; and a cathode. At least one anionic exchange polymer electrolyte layer includes a polymer having a plurality of chemically bound positive ions and a plurality of electrostatically bound negative ions. At least one cationic exchange polymer electrolyte layer includes a polymer having a plurality of chemically bound negative ions and a plurality of electrostatically bound positive ions. In certain embodiments, the anode, the cathode, or both can be a porous metal or carbon plate. In other certain embodiments the anode, the cathode, or both can be high surface area electrodes, e.g., composite electrodes including an ionic exchange polymer electrolyte having a plurality of particles (e.g., carbon or graphite nanoparticles) therein. In certain embodiments, the device further includes a non-electrically conductive dielectric oil (e.g., a polydimethylsiloxane), preferably within the solid multilayer electrolyte. In preferred embodiments, the device is configured to be initially charged to store energy in an electrochemical mode, and further charged to store energy in an electrostatic mode.

In another embodiment, the energy storage device includes: an anode; a solid multilayer electrolyte including a plurality of layers including alternating anionic exchange polymer electrolyte layers and cationic exchange polymer electrolyte layers; and a cathode. At least one anionic exchange polymer electrolyte layer includes a polymer having a plurality of chemically bound positive ions and a plurality of electrostatically bound negative ions. At least one cationic exchange polymer electrolyte layer includes a polymer having a plurality of chemically bound negative ions and a plurality of electrostatically bound positive ions. At least one anionic exchange polymer electrolyte layer is adjacent the cathode, and at least one cationic exchange polymer electrolyte layer is adjacent the anode. In certain embodiments, the anode, the cathode, or both can be a porous metal or carbon plate. In other certain embodiments the anode, the cathode, or both can be high surface area electrodes, e.g., composite electrodes including an ionic exchange polymer electrolyte having a plurality of particles (e.g., carbon or graphite nanoparticles) therein. In certain embodiments, the device further includes a non-electrically conductive dielectric oil (e.g., a polydimethylsiloxane), preferably within the solid multilayer electrolyte. In preferred embodiments, the device is configured to be initially charged to store energy in an electrochemical mode, and further charged to store energy in an electrostatic mode.

In another aspect, the present disclosure provides a method of storing energy. In one embodiment, the method includes: providing an energy storage device as described herein; applying a field negatively polarized with respect to the cathode and positively polarized with respect to the anode under conditions sufficient to cause substantially all the electrostatically bound positive ions to migrate and be reduced and deposited on the cathode, and substantially all the electrostatically bound negative ions to migrate and be oxidized and deposited on the anode, wherein the residual chemically bound positive ions on the one or more anionic exchange polymer electrolyte layers and the residual chemically bound negative ions on the one or more cationic exchange polymer electrolyte layers form a solid multilayer dielectric including polarized polymer layers (e.g., alternating layers); and further applying a field positively polarized with respect to the anode and negatively polarized with respect to the cathode under conditions sufficient to electrostatically store charge on surfaces of the electrodes.

In another aspect, the present disclosure provides a method of storing energy. In one embodiment, the method includes: providing an energy storage device as described herein; applying a field negatively polarized with respect to the cathode and positively polarized with respect to the anode under conditions sufficient to cause substantially all the electrostatically bound positive ions to migrate and be reduced at the cathode and removed as gas, and substantially all the electrostatically bound negative ions to migrate and be oxidized at the anode and removed as gas, wherein the residual chemically bound positive ions on the one or more anionic exchange polymer electrolyte layers and the residual chemically bound negative ions on the one or more cationic exchange polymer electrolyte layers form a solid multilayer dielectric including polarized polymer layers (e.g., alternating layers); and further applying a field positively polarized with respect to the anode and negatively polarized with respect to the cathode under conditions sufficient to electrostatically store charge on surfaces of the electrodes.

In another aspect, the present disclosure provides an at least partially charged energy storage device. In one embodiment, the device includes: an anode; a solid multilayer dielectric including layers of one or more canonically polarized polymer layers and one or more anionically polarized polymer layers; and a cathode. At least one canonically polarized polymer layer includes a plurality of chemically bound positive ions. At least one anionically polarized polymer layer includes a plurality of chemically bound negative ions.

In another embodiment, the device includes: an anode; a solid multilayer dielectric including alternating layers of one or more canonically polarized polymer layers and one or more anionically polarized polymer layers; and a cathode. At least one canonically polarized polymer layer includes a plurality of chemically bound positive ions. At least one anionically polarized polymer layer includes a plurality of chemically bound negative ions. Further, at least one canonically polarized polymer layer is adjacent the cathode and at least one anionically polarized polymer layer is adjacent the anode.

In another aspect, the present disclosure provides a method of storing energy. The method includes: providing an at least partially charged energy storage device as described herein; and applying a field positively polarized with respect to the anode and negatively polarized with respect to the cathode under conditions sufficient to electrostatically store charge on surfaces of the electrodes.

In another embodiment, the present disclosure provides an at least partially charged energy storage device including: an anode; a solid multilayer dielectric having a relative permittivity of at least 80,000 (and in certain embodiments at least 20,000 ); and a cathode. In certain embodiments, the solid multilayer dielectric can have a relative permittivity of at least 25,000, 50,000, or even 100,000.

In another aspect, the present disclosure provides a system for storing and discharging energy. In one embodiment, the system includes: one or more at least partially charged energy storage devices as described herein; a means for applying a field negatively polarized with respect to the cathode and positively polarized with respect to the anode (e.g., using a current source such as a direct current source, which can optionally be a continuous current source) under conditions sufficient to electrostatically store charge on surfaces of the electrodes; and a means for discharging energy from electrostatically stored charge on surfaces of the electrodes (e.g., using a resistive and/or mechanical drain, such as heaters and/or motors).

In another aspect, the present disclosure provides a method of making a solid multilayer electrolyte. In certain embodiments, the method includes roll laminating layers (e.g., alternating layers) of anionic exchange polymer electrolyte and cationic exchange polymer electrolyte.

In another aspect, the present disclosure provides a method of making an energy storage device. In certain embodiments, the method includes providing a solid multilayer electrolyte between an anode and a cathode.

In another aspect, the present disclosure provides cells and cell packs including one or more energy storage devices as described herein.

In certain embodiments, the energy storage devices, methods, and systems disclosed herein can provide advantages over energy storage devices, methods, and systems known in the art. For example, solid multilayer dielectrics having alternating polarized polymer layers can have breakdown voltages in excess of 120 V/micrometer and low leakage current as a result of the high resistivity of the inherently non-electrically conductive electrolyte layers. Further, the high dielectric permittivity and large breakdown voltage can allow for operation at higher voltages, enabling fabrication of cells capable of storing amounts of energy comparable to, and preferably in excess of, lithium ion batteries, while retaining desirable capacitor characteristics such as, for example, rapid delivery of energy. For another example, high dielectric permittivity of the solid multilayer dielectrics combined with at least a modest plate surface area and high voltage can result in high energy density structures having a large total energy storage capacity. In preferred embodiments, energy storage devices as disclosed herein can have a stored energy capacity greater than gasoline (e.g., 34 million joules per liter).

As used herein, "a," "an," "the," and "at least one" are used interchangeably and mean one or more than one.

As used herein, the term "comprising," which is synonymous with "including" or "containing," is inclusive, open-ended, and does not exclude additional unrecited elements or method steps.

The above brief description of various embodiments of the present disclosure is not intended to describe each embodiment or every implementation of the present disclosure. Rather, a more complete understanding of the disclosure will become apparent and appreciated by reference to the following description and claims in view of the accompanying drawing. Further, it is to be understood that other embodiments may be utilized and structural changes may be made without departing from the scope of the present disclosure.

DETAILED DESCRIPTION OF ILLUSTRATIVE EMBODIMENTS

Capacitors typically store charge on electrically conductive surfaces. These charge-bearing surfaces are separated by a dielectric; an electrical insulator with a bilk resistance greater than $10^6$ ohm-cm. As a charge is placed on the material surfaces, an electrical field is established between the plates resulting in a voltage. The net charge stored within the capacitor is always zero.

Charge can be added to the plates until the electric field becomes so strong that it breaks down the dielectric. One measure of the performance of a dielectric material is its permittivity, i.e., its capacitance per unit length. The higher the permittivity, the slower the electric field will build for a given amount of charge. The other measure of the performance of a dielectric is breakdown voltage, i.e., the electric field strength that can cause the dielectric to rupture (reported in volts per unit thickness of the dielectric).

An additional concept can be considered for the materials and devices disclosed herein. The dielectric constant, Epsilon Relative, $E_r$, for these materials is not a constant, but a function of voltage. Due to the configuration of charges within the polymer electrolyte, as the plate voltage of the capacitor increases, the dielectric constant will also increase. This effect can be explained by the ionic spacing of the charges along the polymer molecules of the electrolyte. As the plate electric field increases, the spaces between the charges also increases. As the space increases, the attractive force between the charges decreases by $1/distance^2$. The decrease in polymer charge attractive force makes polarization to the plate electric field easier which is, by definition, an increase in the dielectric constant.

While a battery stores energy as a chemical potential, a capacitor stores energy in an electric field created by charge on the plates. A capacitor typically can accept and deliver energy faster and with less loss than a battery. This makes capacitors more efficient and potentially more powerful than batteries.

The electrical and performance characteristics of a capacitor are generally described by three simple equations:

Charge=Capacitance×Voltage

Capacitance=(Permittivity of the dielectric×A)/d

Stored Energy=½ Capacitance×Voltage$^2$

Figure 1:
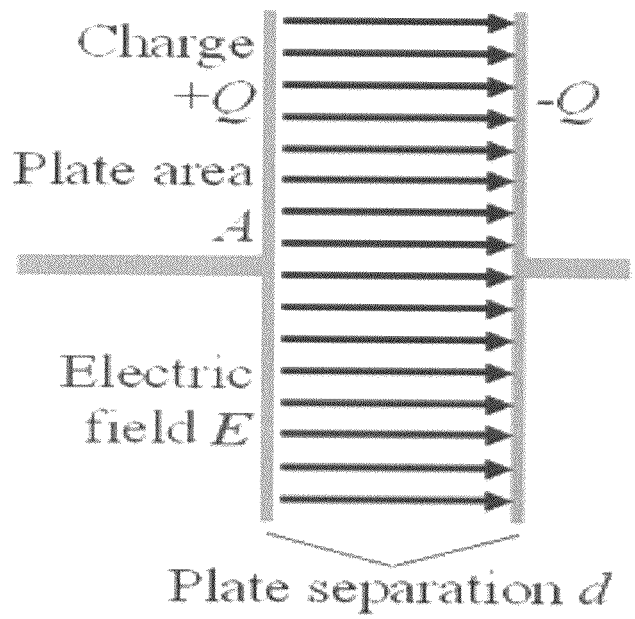
FIG. 1 is a schematic illustration of a simple capacitor.

Referring to FIG. 1, A is the surface area of the electrodes, d is the space between the electrodes, and Q is the charge stored on the plates when an electric field of E is applied to the plates. These equations indicate that capacitance can be increased by increasing the plate area, increasing the permittivity of the dielectric, and/or decreasing the separation between the plates. Further, increasing the voltage on the capacitor has an exponential effect on the energy stored within the device.

Capacitors have the ability to be cycled thousands of times due to the lack of internal electrochemical reactions. However, capacitors typically have not been able to match the energy storage capability of a battery due to lack of available materials and structures that can tolerate electric fields having sufficient strength.

The term "ultracapacitor" has been given to capacitors that begin to approach the energy storage capability of a battery. However, material and structural constraints have limited state-of-the-art ultracapacitors to an energy storage capacity approximately 25 times less than a similarly sized lithium-ion battery.

Figure 2:
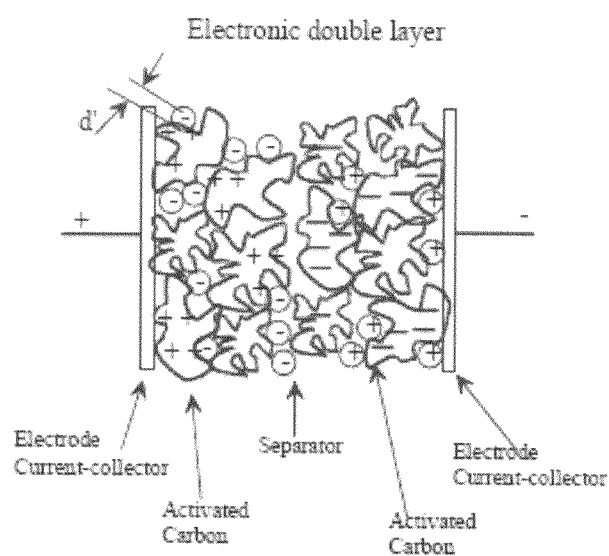
FIG. 2 is a schematic illustration of an electric double layer capacitor (EDLC) structure.

Existing ultracapacitor offerings are based around the electric double layer capacitor (EDLC) principle. In EDLC, a high surface area porous electrode, typically made from carbon, is placed on either side of a dielectric barrier. These electrodes have surface area to weight ratios of 1000 to 2300 meters$^2$ per gram. A liquid electrolyte solution is injected into the porous structure, coating the surface. The solution contains dissolved electrolyte salts suspended in an organic solvent During operation, when charge is present on the capacitor, the electrolyte salts respond to the electric field created by the charge and align along the porous surface of the electrode. This alignment creates a counter electric field which minimizes the net capacitor voltage, allowing the addition of more electrical charge. Since the charge separation is very small (10 Angstroms-100 Angstroms) the resulting capacitances of the structure are very high. Typical cells can have capacitances of 1500 to 3500 farads (F). The structure of the EDLC is shown in FIG. 2. FIG. 2 illustrates two high surface area porous electrodes separated by a separator, and each including a current collector and activated carbon. FIG. 2 shows the alignment of electrolyte ions along the porous surface of each electrode, and the small separation of charges (d) resulting from the electric field when a charge is applied to the cell.

The electrolyte solution enables extremely high capacitances but limits the voltage that can be applied to the cell. Organic solvents employed for the electrolyte solution typically break down at 3 volts (e.g., direct current). For safety, typical EDLC voltages are typically limited to 2.7 volts (e.g., direct current).

In certain embodiments, the devices, methods, and systems disclosed herein can overcome at least some of these constraints by using, among other things, materials that have the required permittivity and breakdown voltage to store, charge, and discharge energy, preferably at performance levels equivalent or superior to the best lithium ion batteries.

The following examples are offered to further illustrate various specific embodiments and techniques of the present disclosure. It should be understood, however, that many variations and modifications understood by those of ordinary skill in the art may be made while remaining within the scope of the present disclosure. Therefore, the scope of the disclosure is not intended to be limited by the following example.

In certain embodiments, the devices, methods, and systems disclosed herein do not function as typical EDLC devices. For example, in certain embodiments, the energy storage devices disclosed herein exhibit behavior analogous to an electrochemical battery at lower voltages, but transition to electrostatic capacitor behavior as voltages rise (e.g., above a few volts).

In one embodiment, energy storage devices as disclosed herein can include: an anode; a solid multilayer electrolyte including a plurality of layers including alternating anionic exchange polymer electrolyte layers and cationic exchange polymer electrolyte layers; and a cathode. At least one anionic exchange polymer electrolyte layer includes a polymer having a plurality of chemically bound positive ions and a plurality of electrostatically bound negative ions. At least one cationic exchange polymer electrolyte layer includes a polymer having a plurality of chemically bound negative ions and a plurality of electrostatically bound positive ions. At least one anionic exchange polymer electrolyte layer is adjacent the cathode, and at least one cationic exchange polymer electrolyte layer is adjacent the anode. In certain embodiments, the anode, the cathode, or both can be a porous metal or carbon plate. In other certain embodiments the anode, the cathode, or both can be high surface area electrodes, e.g., composite electrodes including an ionic exchange polymer electrolyte having a plurality of particles (e.g., carbon or graphite nanoparticles) therein. In certain embodiments, the device further includes a non-electrically conductive dielectric oil (e.g., a polydimethylsiloxane), preferably within the solid multilayer electrolyte. In preferred embodiments, the device is configured to be initially charged to store energy in an electrochemical mode, and further charged to store energy in an electrostatic mode.

In one embodiment, energy storage devices as disclosed herein can store energy by the following method. The method can include: providing an energy storage device as described herein; applying a field negatively polarized with respect to the cathode and positively polarized with respect to the anode under conditions sufficient to cause substantially all the electrostatically bound positive ions to migrate and be reduced and deposited on the cathode, and substantially all the electrostatically bound negative ions to migrate and be oxidized and deposited on the anode, wherein the residual chemically bound positive ions on the one or more anionic exchange polymer electrolyte layers and the residual chemically bound negative ions on the one or more cationic exchange polymer electrolyte layers form a solid multilayer dielectric including alternating polarized polymer layers; and further applying a field negatively polarized with respect to the cathode and positively polarized with respect to the anode under conditions sufficient to electrostatically store charge on surfaces of the electrodes. As used herein, migration and deposition of "substantially" all the electrostatically bound ions means that at least 80% of the ions, and preferably at least 90%, at least 95%, or even at least 99% of the electrostatically bound ions have migrated and been deposited.

Thus, in one embodiment, an energy storage device as disclosed herein can initially function in a manner similar to that of a redox battery (e.g., a sodium iodide redox battery). In brief, application of voltage (e.g., continuous direct current) to the electrodes of the device can cause sodium ions in the solid multilayer electrolyte to migrate and be reduced and deposited on the cathode, and for iodide ions in the solid multilayer electrolyte to migrate and be oxidized and deposited on the anode (i.e., plated out" on the electrodes). When the energy storage device is substantially charged as a redox battery and the available ions within the dielectric have been substantially depleted, the structure begins to act as an electrostatic capacitor. As used herein, "substantially charged" means that a voltage has been applied to the plates sufficient to cause a current to flow into the capacitor and result in the rearrangement of the electrostatically bound ions in the electrolyte. As used herein, "substantial depletion" of the available ions means that substantially all the electrostatically bound ions have migrated and been deposited as discussed herein above.

In another embodiment, energy storage devices as disclosed herein can store energy by the following method. The method can include: providing an energy storage device as described herein; applying a field negatively polarized with respect to the cathode and positively polarized with respect to the anode under conditions sufficient to cause substantially all the electrostatically bound positive ions to migrate and be reduced at the cathode and removed as gas, and substantially all the electrostatically bound negative ions to migrate and be oxidized at the anode and removed as gas, wherein the residual chemically bound positive ions on the one or more anionic exchange polymer electrolyte layers and the residual chemically bound negative ions on the one or more cationic exchange polymer electrolyte layers form a solid multilayer dielectric including alternating polarized polymer layers; and further applying a field negatively polarized with respect to the cathode and positively polarized with respect to the anode under conditions sufficient to electrostatically store charge on surfaces of the electrodes. As used herein, migration and removal of "substantially" all the electrostatically bound ions means that at least 80% of the ions, and preferably at least 90%, at least 95%, or even at least 99% of the electrostatically bound ions have migrated and been removed as gas.

Thus, in one embodiment, an energy storage device as disclosed herein can initially function in a manner similar to that of a redox battery (e.g., a sodium iodide redox battery). In brief, application of voltage (e.g., continuous direct current) to the electrodes of the device can cause hydrogen ions in the solid multilayer electrolyte to migrate and be reduced at the cathode and removed as hydrogen gas ($H_2$), and for chloride ions in the solid multilayer electrolyte to migrate and be oxidized at the anode and removed as chlorine gas ($Cl_2$). When the energy storage device is substantially charged as a redox battery and the available ions within the dielectric have been substantially depleted, the structure begins to act as an electrostatic capacitor. As used herein, "substantially charged" means that a voltage has been applied to the plates sufficient to cause a current to flow into the capacitor and result in the rearrangement of the electrostatically bound ions in the electrolyte. As used herein, "substantial depletion" of the available ions means that substantially all the electrostatically bound ions have migrated and been removed as gas as discussed herein above.

The presently disclosed devices can differ from known electrostatic capacitors in that the dielectric layer between the plates can have a relative permittivity in the tens of thousands and can be stable at voltages far exceeding EDLC constraints. When the polarized dielectric layer is combined with high surface area composite electrodes, energy densities exceeding lithium ion battery levels are possible.

Solid Multilayer Electrolytes

The present disclosure provides a high charge density, high ion conductivity polymer electrolyte, as described herein. A dielectric with high electronic resistance (e.g., $10^{-7}$ to $10^{-11}$ ohm-cm bulk resistance) can be constructed from alternating layers of anionic exchange polymer electrolyte and cationic exchange polymer electrolyte. The thickness of each layer can be selected as desired, and typically can be 500 nanometers to 5000 nanometers. Conveniently, each layer can be approximately 1,000 nanometers in thickness. The alternating layers can include from 2 to 40 layers. Conveniently, 12 to 24 alternating layers can used, in which case layers approximately 1,000 nanometers thick can form a dielectric structure having a thickness of 12 to 24 micrometers. The alternating polymer electrolyte layers can be arranged such that the layer adjacent or facing the cathode is an anionic exchange polymer electrolyte and the layer adjacent or facing the anode is a cationic exchange polymer electrolyte.

The anionic exchange polymer electrolyte layer includes a polymer having a plurality of chemically bound positive ions and a plurality of electrostatically bound negative ions. A wide variety of anionic exchange polymer electrolytes can be used in the devices, methods, and systems disclosed herein. Exemplary chemically bound positive ions include ammonium (e.g., quaternary ammonium), phosphonium (e.g., quaternary phosphonium), sulfonium (e.g., tertiary sulfonium), and combinations thereof. Exemplary electrostatically bound negative ions include, for example, halides (e.g., chloride, fluoride, bromide, and/or iodide), pseudohalides (e.g., azides, isocyanides), $SbF_6^-$, $PF_6^-$, and combinations thereof. In certain embodiments, the anionic exchange polymer electrolyte layer can include an optionally crosslinked anionic exchange polymer (e.g., an iodide anionic exchange polymer).

In certain embodiments, the anionic exchange polymer electrolyte can be a polystyrene having $-CH_2NR_3^+X^-$ groups attached to the aromatic ring (e.g., in the ortho and/or para positions) of at least a portion of the styrene units, wherein each R can independently represent a C1-C10 alkyl group, and X can represent a halide. An exemplary anionic exchange polymer electrolyte can be a polystyrene having —$CH_2N(CH_3)_3^+Cl^-$ groups attached to the aromatic ring of at least a portion of the styrene units, which can conveniently be prepared by aminating a chloromethylated polystyrene with a tertiary amine Another exemplary anionic exchange polymer electrolyte can be a polystyrene having —$CH_2N(CH_3)_3^+I^-$ groups attached to the aromatic ring of at least a portion of the styrene units, which can conveniently be prepared by aminating a chloromethylated polystyrene with a tertiary amine, and exchanging chloride for iodide.

The cationic exchange polymer electrolyte layer includes a polymer having a plurality of chemically bound negative ions and a plurality of electrostatically bound positive ions. A wide variety of cationic exchange polymer electrolytes can be used in the devices, methods, and systems disclosed herein. Exemplary chemically bound negative ions include sulfonate, carboxylate, phosphate, phosphonate, and combinations thereof. Exemplary electrostatically bound positive ions include, for example, hydrogen ions ($H^+$), alkali metal ions (e.g., lithium, sodium, potassium, rubidium, and/or cesium), alkaline earth metal ions (e.g., calcium, strontium, and/or barium), and combinations thereof. In certain embodiments, the cationic exchange polymer electrolyte layer can include an optionally crosslinked cationic exchange polymer (e.g., a sodium cationic exchange polymer).

In certain embodiments, the cationic exchange polymer electrolyte can be a polystyrene having sulfonate groups attached to the aromatic ring (e.g., in the ortho and/or para positions) of at least a portion of the styrene units. For example, polymers having pendant aryl sulfonate groups are described, for example, in U.S. Pat. No. 5,468,574 (Ehrenberg et al.), U.S. Pat. No. 5,677,074 (Serpico et al.), U.S. Pat. No. 5,679,482 (Ehrenberg et al.), U.S. Pat. No. 5,840,387 (Berlowitz-Tarrant et al.), U.S. Pat. No. 6,110,616 (Sheikh-Ali et al.), U.S. Pat. No. 6,383,391 Ehrenberg et al.), U.S. Pat. No. 6,413,298 (Wnek et al.), U.S. Pat. No. 6,841,601 (Serpico et al.), and U.S. Pat. No. 7,179,860 (Cao et al.); and U.S. Patent Application Publication No. 2008/0316678 (Ehrenberg et al.).

The general structures of the polymers used for the anionic and cationic exchange polymer electrolytes can be the same or different. As used herein, the term "polymers" is intended to be broadly interpreted to include, for example, oligomers. In certain embodiments, polymers having the same general structure can be modified through chemical reactions (e.g., sulfonations) or substitution reactions of the polymers and/or the monomers used to prepare the polymers, to become anionic and/or cationic polymer exchange electrolytes. In certain embodiments, the general structure of the polymers can result in self assembly properties that can create nanostructure that can be important for ionic conduction and charge separation.

For embodiments in which the exchange polymer electrolyte is sulfonated, the polymer to be sulfonated can have a high styrenic content and/or a controlled distribution of carbon-carbon double bonds. In certain embodiments, the exchange polymer electrolyte can be a highly sulfonated polymer composite. For embodiments in which the exchange polymer electrolyte is sulfonated, the polymer can be highly uniformly sulfonated (i.e. from about 25-100% sulfonated by weight), and may be utilized in the form of a sulfonated sheet or membrane. Processes for sulfonating polymers are described, for example, in Gilbert, Chem Rev(1962) 62:549-589; and German Patent No. DE 580,366.

The sulfonated polymers described herein cam be sulfonated by a wide variety of methods. Sulfonation generally refers to an organic chemical reaction that leads to the formation of a carbon-sulfur bond. When the reacting compound contains an aromatic ring, sulfonation at the aromatic ring by the reactive (sulfonating) compound usually occurs by replacing a hydrogen atom on the aromatic ring by a sulfonic acid residue functional group by means of an electrophilic aromatic substitution reaction. Sulfonated block copolymers may be produced by sulfonation reaction using, for example, sulfur trioxide, sulfuric acid, chlorosulfonic acid, and/or acetyl sulfate as the sulfonating agent. The sulfonated polymers could be used in their produced form, or in their acid, alkali metal salt, or ammonium salt (including complex amine) forms.

In certain embodiments, the anionic and/or cationic exchange polymer electrolytes can include, for example, peptides, polypeptides, proteins, glycoproteins, biopolymers, and combinations thereof. In certain embodiments, the anionic and/or cationic exchange polymer electrolytes can include, for example, homopolymers and/or copolymers (e.g., a statistical, random, or block copolymer). In other certain embodiments, the anionic and/or cationic exchange polymer electrolytes can include, for example, single or multiphase polymers and/or copolymers. In certain embodiments, the anionic and/or cationic exchange polymer electrolytes can include, for example, an ionomer.

In general, ionomers contain both polar and non-polar moieties, which each group together. The polar ionic moieties tend to cluster together and separate from the nonpolar backbone moieties, which allows for thermoplasticity, especially when heated. This increased thermoplasticity allows for increased energy storage and increased ability to cycle. Additionally, the non-ionic areas can exhibit adhesive properties. In certain embodiments, a balance between thermoplasticity and flow at a certain temperature can be desirable.

In certain embodiments, the anionic and/or cationic exchange polymer electrolytes can include, for example, arene-containing linear side chains, non-arene-containing linear side chains, saturated linear side chains, unsaturated linear side chains, and flexible hydrocarbon linear side chains. In certain embodiments, the anionic and/or cationic exchange polymer electrolytes can be, for example, unsubstituted and/or substituted (e.g., substituted with heteroatoms such as oxygen, nitrogen, or other non-carbon atoms). In certain embodiments, the anionic and/or cationic exchange polymer electrolytes can are capable of being dissolved in chlorinated solvents, and may stay in solution at cold temperatures.

As used herein, an "alkene moiety" refers to a hydrocarbon chain containing at least one carbon-carbon double bond. An "arene moiety" refers to a monovalent or divalent aryl or heteroaryl group. An aryl group refers to hydrocarbon ring system including hydrogen, 6 to 18 carbon atoms, and at least one aromatic ring. The aryl group may be a monocyclic or polycyclic (e.g., bicyclic, tricyclic, or tetracyclic) ring system, which may include fused or bridged ring systems. Aryl groups include, but are not limited to, aryl groups derived from aceanthrylene, acenaphthylene, acephenanthrylene, anthracene, azulene, benzene, chrysene, fluoranthene, fluorene, as-indacene, s-indacene, indane, indene, naphthalene, phenalene, phenanthrene, pyrene, and triphenylene. Preferably, an aryl group is derived from benzene. A heteroaryl group refers to a 5 to 14 membered ring system including hydrogen atoms, one to thirteen carbon atoms, one to six heteroatoms (e.g., nitrogen, oxygen, and/or sulfur), and at least one aromatic ring. The heteroaryl group may be a mono-cycle or polycyclic (e.g., bicyclic, tricyclic, or tetracyclic) ring system, which may include fused or bridged ring systems. The nitrogen, carbon, and/or sulfur atoms in the heteroaryl radical may optionally be oxidized, and the nitrogen atom may optionally be quaternized. Examples include, but are not limited to, azepinyl, acridinyl, benzimidazolyl, benzindolyl, 1,3-benzodioxolyl, benzofuranyl, benzooxazolyl, benzothiazolyl, benzothiadiazolyl, benzo[b][1,4]dioxepinyl, benzo[b][1,4]oxazinyl, 1,4-benzodioxanyl, benzonaphthofuranyl, benzoxazolyl, benzodioxolyl, benzodioxinyl, benzopyranyl, benzopyranonyl, benzofuranyl, benzofuranonyl, benzothienyl (benzothiophenyl), benzothieno[3,2-d]pyrimidinyl, benzotriazolyl, benzo[4,6]imidazo[1,2-a]pyridinyl, carbazolyl, cinnolinyl, cyclopenta[d]pyrimidinyl, 6,7-dihydro-5H-cyclopenta[4,5]thieno[2,3-d]pyrimidinyl, 5,6-dihydrobenzo[h]quinazolinyl, 5,6-dihydrobenzo[h]cinnolinyl, 6,7-dihydro-5H-benzo[6,7]cyclohepta[1,2-c]pyridazinyl, dibenzofuranyl, dibenzothiophenyl, furanyl, furanonyl, furo [3,2-c]pyridinyl, 5,6,7,8,9,10-hexahydrocycloocta[d]pyrimidinyl, 5,6,7,8,9,10-hexahydrocycloocta[d]pyridazinyl, 5,6, 7,8,9,10-hexahydrocycloocta[d]pyridinyl, isothiazolyl, imidazolyl, indazolyl, indolyl, indazolyl, isoindolyl, indolinyl, isoindolinyl, isoquinolyl, indolizinyl, isoxazolyl, 5,8-methano-5,6,7,8-tetrahydroquinazolinyl, naphthyl, naphthyridinyl, 1,6-naphthyridinonyl, oxadiazolyl, 2-oxoazepinyl, oxazolyl, oxiranyl, 5,6,6a,7,8,9,10,10a-octahydrobenzo[h] quinazolinyl, 1-phenyl-1H-pyrrolyl, phenazinyl, phenothiazinyl, phenoxazinyl, phthalazinyl, pteridinyl, purinyl, pyrrolyl, pyrazolyl, pyrazolo[3,4-d]pyrimidinyl, pyridinyl, pyrido[3,2-d]pyrimidinyl, pyrido[3,4-d]pyrimidinyl, pyrazinyl, pyrimidinyl, pyridazinyl, pyrrolyl, quinazolinyl, quinoxalinyl, quinolinyl, quinuclidinyl, isoquinolinyl, tetrahydroquinolinyl, 5,6,7,8-tetrahydroquinazolinyl, 5,6,7,8-tetrahydrobenzo[4,5]thieno[2,3-d]pyrimidinyl, 6,7,8,9-tetrahydro-5H-cyclohepta[4,5]thieno[2,3-d]pyrimidinyl, 5,6,7,8-tetrahydropyrido[4,5-c]pyridazinyl, thiazolyl, thiadiazolyl, triazolyl, tetrazolyl, triazinyl, thieno[2,3-d]pyrimidinyl, thieno[3,2-d]pyrimidinyl, thieno[2,3-c]pridinyl, and thiophenyl (i.e. thienyl).

As used herein, an "arene-containing linear side chain" refers to an unbranched hydrocarbon chain consisting only of carbon and/or hydrogen, wherein at least one carbon in the chain is replaced with an aryl or heteroaryl group, as defined above.

As used herein, a "non-arene-containing linear side chain" refers to an unbranched hydrocarbon chain consisting only of carbon and/or hydrogen and containing no aryl or heteroaryl groups within the chain.

As used herein, an "unsaturated linear side chain" refers to an unbranched hydrocarbon chain consisting only of carbon and/or hydrogen and including at least one carbon-carbon double bond or at least one carbon-carbon triple bond. As used herein, a "saturated linear side chain" refers to an unbranched hydrocarbon chain consisting only of carbon and/or hydrogen and containing no carbon-carbon double bonds and no carbon-carbon triple bonds.

As used herein, a "flexible hydrocarbon linear side chain" refers to a flexible connecting component as disclosed, for example, in U.S. Pat. No. 5,468,574 (Ehrenberg et al.) and U.S. Pat. No. 5,679,482 (Ehrenberg et al.).

Various types of copolymers, including block copolymers, exist that may be used with certain embodiments disclosed herein. For example, alternating copolymers include regular alternating A and B chemical or constitutional units; periodic copolymers contain A and B units arranged in a repeating sequence (e.g., (A-B-A-B-B-A-A-A-B-B)$_n$); random copolymers including random sequences of monomer A and monomer B units; statistical copolymers including an ordering of distinct monomers within the polymer sequence that obeys statistical rules; block copolymers that include two or more homopolymer subunits linked by covalent bonds such as, for example, diblock, tri-block, tetra-block or other multi-block copolymers. See, for example, IUPAC, *Pure Appl Chem* (1996) 68:2287-2311.

Additionally, any of the copolymers described may be linear (including a single main chain), or branched (including a single main chain with one or more polymeric side chains). Branched copolymers that have side chains that are structurally distinct from the main chain are known as graft copolymers. Individual chains of a graft copolymer may be homopolymers or copolymers, and different copolymer sequencing is sufficient to define a structural difference. For example, an A-B diblock copolymer with A-B alternating copolymer side chains is considered a graft copolymer. Other types of branched copolymers include star, brush, and comb copolymers. Any one of these copolymers, or any mixture thereof, may be utilized with certain aspects of the disclosed devices.

In certain embodiments, the anionic and/or cationic exchange polymer electrolytes can include, for example, a polymer including at least one block, In certain embodiments, the polymer is a thermoplastic block copolymer. In other embodiments, the polymer is a block copolymer that includes differentiable monomeric units. Preferably, at least one of the monomeric units of the block copolymer includes an arene moiety-containing unit. In other preferred embodiments, at least one block includes a non-arene moiety-containing unit. In certain embodiments, the block copolymer includes at least two monomeric units arranged in statistically random order. In other embodiments, the block copolymer includes at least two monomeric units arranged in ordered sequence. In certain embodiments, the anionic and/or cationic exchange polymer electrolytes can include, for example, not only polymers or block copolymers, but also copolymers with other ethylenically unsaturated monomers (e.g., acrylonitrile, butadiene, methyl methacrylate, and combinations thereof).

In certain embodiments, a block copolymer can be a block copolymer having at least a first block of one or more mono alkene-arene moieties, such as styrene, ring-substituted styrene, a-substituted styrene, or any combination thereof; and a second block of a controlled distribution copolymer of a diene moiety and a mono alkene-arene moiety. The block copolymer can be any configuration of "A" and "B" blocks, and such block copolymers can be generated by a wide variety of methods known to one of skill in the art.

As used herein, a "mono alkene-arene moiety" refers to one or more alkene moieties, as defined above, covalently bonded to an arene moiety, as defined above. An example of a "mono alkene-arene moiety" is styrene. A "poly alkene-arene moiety" refers to a two or more mono alkene-arene moieties, as defined above, covalently bonded to each other to form a chain including two or more mono alkene-arene moieties. An example of a "poly alkene-arene moiety" is polystyrene. A "diene moiety" refers to a hydrocarbon chain containing two carbon-carbon double bonds. In certain embodiments, the diene moiety may be conjugated, unconjugated, or cumulated.

Some specific examples of block copolymers include, for example, those described in U.S. Pat. No. 4,248,821 (Van Dellen), U.S. Pat. No. 5,239,010 (Balas et al.), U.S. Pat. No. 6,699,941 (Handlin et al.), U.S. Pat. No. 7,001,950 (Handlin, Jr. et al.), U.S. Pat. No. 7,067,589 (Bening et al.), U.S. Pat. No. 7,169,848 (Bening et al.), U.S. Pat. No. 7,169,850 (Handlin, Jr. et al.), and U.S. Pat. No. 7,186,779 (Joly et al.), and U.S. Patent Application Publication Nos. 2005/0154144 (Atwood et al.), 2007/0004830 (Flood et al.), 2007/0020473 (Umana et al.), 2007/0021569 (Willis et al.), 2007/0026251 (Umana), 2007/0037927 (Yang), and 2007/0055015 (Flood et al.).

In certain embodiments, the anionic and/or cationic exchange polymer electrolytes can include, for example, a statistical copolymer. A statistical copolymer is used herein consistent with the commonly understood usage in the art. See, for example, Odian, Principles of Polymerization, 1991. Statistical copolymers can be derived from the simultaneous polymerization of two monomers and can have, for example, a distribution of the two monomeric units along the copolymer chain, which follows Bernoullian (zero-order Markov), or first or second order Markov statistics. The polymerization may be initiated by free radical, anionic, cationic, or coordinatively unsaturated (e.g., Ziegler-Natta catalysts) species. According to Ring et al., (Pure Appl Chem (1985) 57:1427), statistical copolymers can be the result of elementary processes leading to the formation of a statistical sequence of monomeric units that do not necessarily proceed with equal probability.

These processes can lead to various types of sequence distributions including those in which the arrangement of monomeric units tends toward alternation, tends toward clustering of like units, or exhibits no ordering tendency at all. Bernoullian statistics is essentially the statistics of coin tossing; copolymers formed via Bernoullian processes have the two monomers distributed randomly and are referred to as random polymers. For example, it is possible in a free radical copolymerization for the active end, in the case of one embodiment, a styryl or butadienyl radical, to have essentially no selectivity for styrene vs. butadiene. If so, the statistics will be Bernoullian, and the copolymer obtained will be random. More often than not, there will be a tendency for the propagating chain end to have some selectivity for one monomer or the other. In some cases block copolymers can be derived from the simultaneous copolymerization of two monomers when the preference of the propagating chain ends for adding the opposite monomers is very low. The resulting polymer would be categorized as a block copolymer for the purposes of the present disclosure.

Statistical copolymers generally display a single glass transition temperature. Block and graft copolymers typically display multiple glass transitions, due to the presence of multiple phases. Statistical copolymers are, therefore, distinguishable from block and graft copolymers on this basis. The single glass transition temperature reflects homogeneity at the molecular level. An additional consequence of this homogeneity is that statistical copolymers, such as those of styrene and butadiene, when viewed by electron microscopy, display a single phase morphology with no microphase separation. By contrast, block and graft copolymers of styrene/butadiene, for example, are characterized by two glass transition temperatures and separation into styrene-rich domains and butadiene-rich domains It should be noted that membranes which are produced from statistical copolymers originally having a single glass transition temperature and a single phase morphology do not necessarily exhibit a single phase morphology or a single glass transition temperature after sulfonation because of chemical changes in the polymer effected by the sulfonation, in combination with the physical changes effected by the casting processes of the present disclosure.

Pseudo-random copolymers are a subclass of statistical copolymers which result from a weighted change in the monomer incorporation that skews the distribution from a random arrangement (i.e. Bernoullian) that is defined as statistical. Linear arrangements have been described here, but branched or grafted including star arrangements of monomers are possible as well. In addition, block copolymers of styrene and hydrogenated butadiene, isoprene, or equivalent olefin can be employed. The block architecture can be monomeric units including diblock, triblock, graft-block, multi-arm starblock, multiblock, segmented, tapered block, or any combination thereof.

In certain such embodiments, the polymer includes moieties or segments including unsaturated carbon-carbon double bonds, which are able to be sulfonated. Some examples of such polymers include, but are not limited to, polybutadiene and/or polyisoprene.

In particular, certain embodiments disclosed herein relate to the sulfonation of polymers including one or more of the following moieties: alkane, alkene, alkyne, and arene, each of which may be optionally substituted by one or more of the following functional groups: carboxylic acid, urea, ester, urethane (carbamate), alkene, amide, benzene, pyridine, indole, carbonate, thioester, arcylate/acrylic, ether, amidine, ethyl, acid versions of aliphatic compounds that contain alkenes, alkanes or alkynes, imidazole, oxazole, and other possible combinations of heteroatom containing groups susceptible to loss of water and/or disassembly. Each of the terms listed above has its standard definition known to one skilled in the art.

The weight of the polymers utilized in the present disclosure are preferably at least approximately 1 kilo Dalton (KD), 2 KD, 5 KD, 10 KD, 15 KD, 20 KD, 25 KD, 30 KD, 40 KD, 50 KD, 60 KD, 70 KD, 80 KD, 90 KD, or any value therebetween or greater.

Some examples of polymers or blocks of polymers that may be included in certain embodiments include, but are not limited to, polyethylene (PE), polypropylene (PP), polyethylene oxide (PEO), polystyrene (PS), polyesters, polycarbonate (PC), polyvinyl chloride (PVC), nylon, halogenated polymers or copolymers such as perfluorinated copolymers, poly (methyl methacrylate) (PMMA), acrylonitrile butadiene styrene (ABS), polyamide (PA), polyurethane (PU), polytetrafluoroethylene (FIFE), polylactic acid (PLA), polyvinylidene chloride (PVDC), styrene-butadiene rubber (SBR), styrene-ethylene/butylenes-styrene (SEBS); styrene-ethylene/propylene-styrene (SEPS), ethylene-styrene interpolymer (ESI), styrene acrylate, polyetherether ketone (PEEK), polyethylene terephthalate (PET or PETE), and any combination of these or others.

Polymers of various degrees of polymerization are also included in the present disclosure. As one of skill in the art would readily appreciate, the degree of polymerization generally refers to the number of repeat milts or segments in an average polymer chain at a particular time in a polymerization reaction, where length is measured by monomer segments or units. Preferable lengths include, but are not limited to, approximately 500 monomer units, 1000 monomer units, 5000 monomer units, 10,000 monomer units, 25,000 monomer units, 50,000 monomer units, 100,000 monomer units, 200,000 monomer units, 300,000 monomer units, 500,000 monomer units, 700,000 monomer units, or greater or any value there between.

The degree of polymerization may also be a measure of the molecular weight of a polymer. Thus, the degree of polymerization is equal to the total molecular weight of the polymer divided by the total molecular weight of the repeating unit or segment. Polymers with different total molecular weights but identical composition may exhibit different physical properties. Generally, a greater degree of polymerization correlates with a greater melting temperature and greater mechanical strength.

In certain embodiments, the polymer can include a multiphase large molecular chain polymer. In some embodiments the multiphase large molecular chain polymer includes one or more arene-containing linear side chains, non-arene-containing linear side chains, saturated linear side chains, unsaturated linear side chains, and/or flexible hydrocarbon linear side chains.

In certain embodiments, the exchange polymer electrolytes can include a wide variety of anion-conducting groups so long as they are such groups that the material can display sufficient anion conductivity and moisture transfer properties. Such anion-conducting groups include an ammonium group optionally substituted with an alkyl group have 1 to 10 carbon atoms; a pyridinium group having a methyl group or an ethyl group bonded to the nitrogen atom or a pyridyl group that has formed a salt with an acid; an imidazolium group having a methyl group or an ethyl group bonded to the nitrogen atom or an imidazolyl group that has formed a salt with an acid; a phosphonium group optionally substituted with a methyl group or an ethyl group or the like.

As to the position of introduction of the anion-conducting groups into polymer block (A), there is no particular restriction, and they can be introduced either into the aromatic vinyl units or into other monomer units.

The amount of the anion-conducting group introduced can be selected depending upon the application purpose, but usually, in order to display sufficient ion conductivity for use as a polymer exchange electrolyte, the amount is preferably sufficient such that the ion exchange capacity of the block polymer is 0.3 to 4 milliequivalents/g. In certain embodiments, introduction of larger amounts can result in low mechanical strength and/or low long term durability.

Introduction of an anion-conducting group into the resulting block copolymer can be conducted by a known method. For example, the obtained block copolymer can be chloromethylated, and then reacted with an amine or a phosphine. Optionally, the chloride ions can be replaced with hydroxide ions or other acid anions. A wide variety of chloromethylation methods known in the art can be used. For example, a method including adding a chloromethylating agent and a catalyst into a solution or suspension of the block polymer in an organic solvent to chloromethylate the block copolymer can be used. A wide variety of organic solvents including, for example, halogenated hydrocarbons (e.g., chloroform or dichloroethane) can be used. Chloromethylating agents including, for example, chloromethyl ether and/or hydrochloric acid-paraformaldehyde can be used, and catalysts including, for example, tin chloride and/or zinc chloride can be used.

A wide variety of methods for reacting an amine or a phosphine with a chloromethylated block polymer can be used. For example, a method including adding an amine or phosphine (e.g., as a solution in an organic solvent) to a solution or suspension of a chloromethylated block copolymer in an organic solvent, or a material formed form the solution or suspension, can be used. A wide variety of organic solvents can be used for preparing the solution or suspension including, for example, methanol, ethanol, acetone, and/or acetonitrile. A wide variety of amines can be used including, for example, ammonia, primary amines (e.g., methyl amine), secondary amines (e.g., dimethyl amine), and combinations thereof can be used to obtain a weakly basic anion exchange polymer; tertiary amines (e.g., dimethyl amine, triethyl amine, dimethylethanol amine, methyl diethanol amine, and/ or triethanol amine) can be used to obtain a strongly basic anion exchange membrane; and diamines or polyamines (e.g., ethylene diamine or tetramethyl diaminopropane) can be used to obtain an anion exchange membrane having ion exchange groups bonded to one another.

A chloride ion can be introduced as an anion-conducting group that can optionally be converted to a hydroxide ion or another acid anion if desired. A wide variety of methods for converting the chloride ion to another ion can be used. For example, a chloride ion can be converted to a hydroxide ion conducting group by immersing a chloride ion-containing block copolymer into an aqueous solution of sodium hydroxide or potassium hydroxide.

The ion exchange capacity of an anion-conducting copolymer can be measured using a wide variety of analytical methods known in the art including, for example, titration methods, infrared spectroscopic analysis, proton nuclear magnetic resonance ($^1$H NMR) spectroscopy, elemental analysis, or combinations thereof.

The dielectric can be constructed by a wide variety of methods known in the art for preparing multilayer constructions. For example, alternating layers of anionic exchange polymer electrolyte and cationic exchange polymer electrolyte can be prepared by simultaneously roll laminating the layers. In some embodiments, layers can be roll laminated sequentially and/or simultaneously. In certain embodiments, layers can be extruded (e.g., sequentially and/or simultaneously coextruded).

Figure 3:
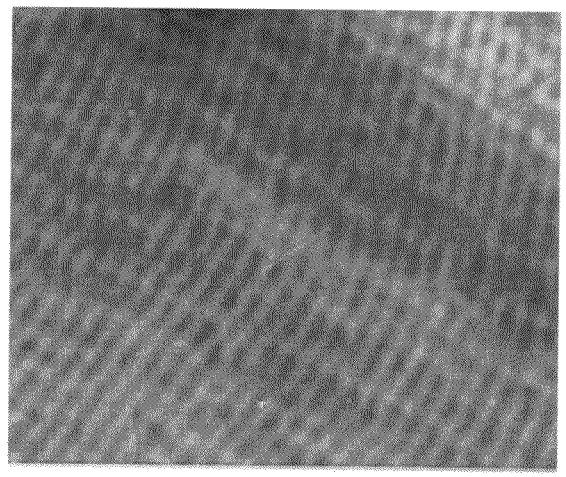
FIG. 3 is a transmission electron micrograph illustrating the lamellar structure of an exemplary self-assembled polymer electrolyte.

In certain embodiments, each layer of electrolyte can have a lameller nanostructure. For example, certain block copolymers can self-assemble during the manufacturing process. For example, a sample of triblock 29 mol % styrene with 55% sulfonation of styrene blocks was prepared and found to exhibit two $T_g$s (−40° C. and 160° C.). The sample was microtomed at −100° C., stained with ruthenium tetroxide, and subjected to transmission electron microscopy (TEM). The micrograph illustrated in FIG. 3 shows lamellae thickness varying from approximately 5 to 30 nanometers. Such structures can have high ionic conductivities, and can be cross-linked for mechanical stability. The charge density of such layers can be high, exceeding commercial fluoropolymer electrolytes by a factor of 2 or 3, as measured by acid equivalents.

Figure 4:
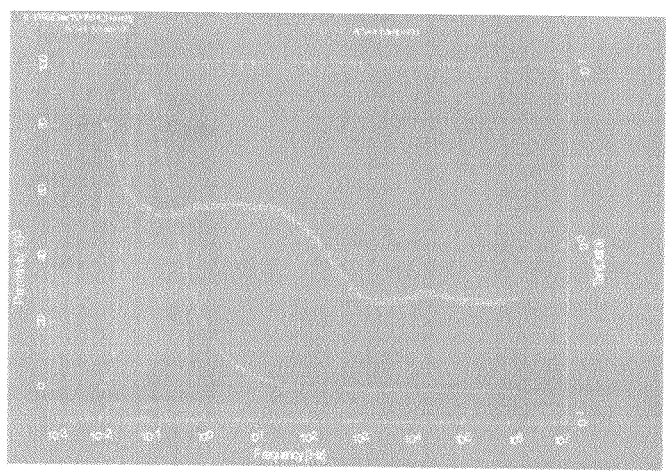
FIG. 4 is a plot of relative permittivity (103; squares; y-axis) and tan(delta) (dashes; y-axis) vs. frequency (Hz; x-axis) observed for an exemplary unpolarized polymer electrolyte structure.

A multilayer alternating anionic and cationic structure including unpolarized polymer electrolyte materials as described herein, can exhibit high relative permittivity behavior with large frequency dependence (due to ionic conduction), as illustrated in the graph shown in FIG. 4. The multilayer structure was a four layer alternating anionic and cationic block copolymers of moderate to low charge density. The anionic and cationic layers had been heat and pressure fused. In preferred embodiments the dielectric is desiccated to improve performance. However, in this experiment no measures were taken to exclude environmental humidity during the testing. The test equipment was a parallel plate capacitance with moderate clamping force. A precision voltage waveform of plus or minus 1 volt with a variable frequency control of 1/1000 of a hertz to more than a megahertz was placed across the sample and the input current monitored for phase delay and distortion. The current phase delay and distortion were used to calculate the sample capacitance and Tan Delta after subtracting out the plate and lead capacitances.

Placing the polymer electrolyte under an external electrical field can overcome the electrostatic forces binding ions to their counter ions in the electrolyte, and allow the previously bound ions to become mobile, and eventually be removed as gas or plated out on the oppositely charged electrode.

As free ions are removed from the dielectric, the electrolyte layer polarizes because the electrolyte counter ion moiety is fixed by covalent bonding to the polymer structure. Once the free ions are removed, the frequency dependence can be minimized or eliminated, and high permittivities (shown in FIG. 4 at $10^{-2}$ hertz) can be stable at elevated direct current voltages. Increasing the electrolyte charge density can increase the resulting polarized permittivity.

Figure 14:
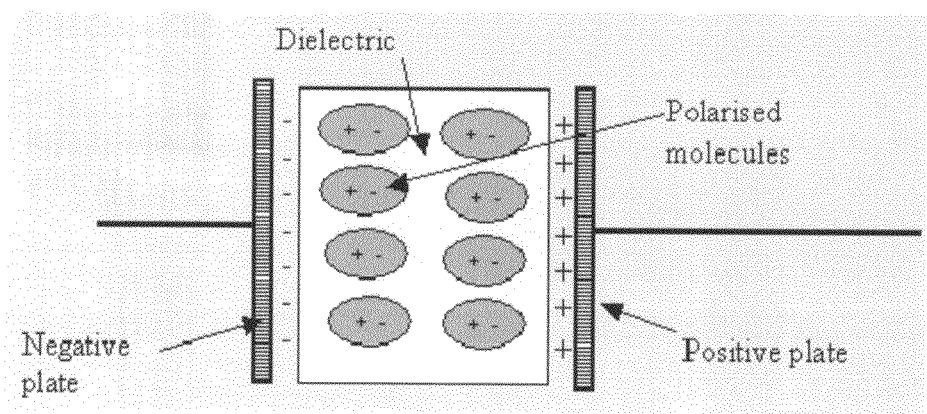
FIGS. 14 and 15 are schematic illustrations of capacitors illustrating the effect of a polarizable dielectric on the function of a capacitor.
Figure 15:
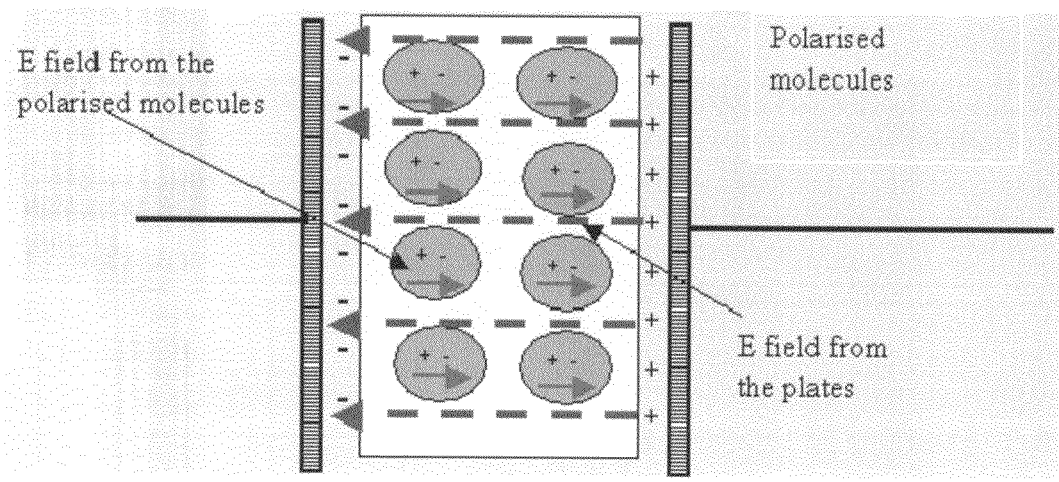

The effect of a polarizable dielectric on the function of a capacitor is schematically illustrated in FIGS. 14 and 15. Referring to FIG. 14, the insulating gap between the plates of a capacitor is called the dielectric. The reference dielectric is a vacuum, but air gives a value that is very similar. When using a dielectric other than air, some insulating materials do not substantially affect the capacitance of the capacitor. However, in other dielectrics (e.g., polythene or waxed paper), the molecules can become polarized as illustrated in FIG. 14. The polarization can result from the electrons moving slightly towards the positive plate, leaving a deficiency of electrons, hence a positive charge, at the other end. A resulting increase in capacitance is illustrated in FIG. 15. The presence of the polarized molecules can alter the electric field between the plates, with the direction of the electric field illustrated going from positive to negative. As illustrated in FIG. 15, the field between the plates goes from right to left, while the polarized molecules make a field that goes from left to right. The overall field can be reduced, allowing more electrons to crowd onto the plates, thereby increasing the charge that can be held by the capacitor.

Removal of the ions from the dielectric layer can be influenced by the ion forms of the electrolyte. In one embodiment, the ions forms are chosen from materials that can form plated layers on the graphite powder surfaces within the composite electrode structures. Areas where the electrolyte has wetted the graphite surfaces can allow ions to plate to the structure. In certain embodiments, $Na^+$ can be selected for the cationic exchange electrolyte and $I^-$ can be selected for the anionic exchange electrolyte.

In another embodiment, the ions forms are chosen from materials that can form gases upon oxidation or reduction at a porous metal or carbon plate electrode. In certain embodiments, $H^+$ can be selected for the cationic exchange electrolyte and $Cl^-$ can be selected for the anionic exchange electrolyte. The gases formed at the electrodes can be removed, for example, by vacuum or a gas flow over the electrode.

Electrodes

The electrodes (i.e., cathode and anode) in the devices, methods, and systems disclosed herein can have metal or otherwise electrically conductive surfaces. In certain embodiments, the electrodes can have high surface area and can optionally be porous (e.g., porous metal or carbon plates). In preferred embodiments, the electrodes include composites such as, for example, an anode including an anionic exchange polymer electrolyte with a plurality of particles, and a cathode including a cationic exchange polymer electrolyte with a plurality of particles. See U.S. Pat. No. 5,136,474 (Sarangapani et al.) for additional examples of composite electrodes.

In certain embodiments, the particles can be applied to the face of an electrode by casting, vapor depositing, spraying, or any other process that allow for application, preferably in a uniform manner. Once applied to the face of the electrode, the particles can increase the functional surface area, resulting in an increase in capacitance of the capacitor. In certain embodiments, the surface area can be increased by at least 100 times, at least 500 times, at least 1,000 times, at least 10,000 times, at least 50,000 times, at least 100,000 times, or even more.

A wide variety of anionic exchange polymer electrolytes and cationic exchange polymer electrolytes can be used for composite electrodes. Exemplary anionic exchange polymer electrolytes and exemplary cationic exchange polymer electrolytes are described herein above. Additional exemplary polymer electrolytes useful for composite electrodes are described in U.S. Patent Application Publication No. 2008/0316678 (Ehrenberg et al.).

The polymer electrolytes can act to hold the particles of the electrode together. In certain embodiments, the polymer electrolytes can act as an adhesive to bind a conductive particle electrode to the interior face of an outer layer (e.g. metal foil). The polymer electrolytes can also serve a dielectric function by modulating the electric field at the surface of the particles, and increasing the charge capacity of the electrode and the cell. The polymer electrolytes can also fill a void between the particles, preventing any voids from creating paths to the dielectric layer.

A wide variety of particles can be used for composite electrodes. In certain embodiments, the particles are conductive. Useful particles can include, for example, carbon, a metal, a metal oxide, or other metal-containing particles. Useful metals include, for example, nickel, titanium (e.g., titanium dioxide), lead, lithium, silver, and copper. Other electrically conductive particles include phthalocyanine oligomers and other electrically conductive materials (e.g., organic molecules and polymers). In certain preferred embodiments, the nanoparticles include carbon. In certain embodiments the particles are particles having high surface area (e.g., greater than 1000 meters$^2$/g and in some embodiments greater than 2000 meters$^2$/g) such as nanoparticles. In preferred embodiments, the nanoparticles are carbon particles (e.g., graphite).

In certain embodiments, nanoparticles can be used to increase the surface area of the composite electrode. The three-dimensional surface of the nanoparticles can allow for increased functional surface area upon which the charge may build the electric field within each electrode layer of the energy storage device. The nanoparticles utilized by certain exemplary embodiments may be of any shape or form, preferably spheroidal, and can be round, oval, irregular, pyramidal, conical, rhomboidal, or any variation of these or other shapes. In certain embodiments, the average diameter of the nanoparticles is at most 150 nm, at most 125 nm, at most 100 nm, at most 75 nm, at most 50 nm, at most 25 nm, at most 10 nm, at most 5 nm, at most 25 nm, at most 2 nm, at most 1 nm, or even less. For nonspherical particles, the diameter is taken to be the largest dimension of the particle.

In certain embodiments, graphite composite electrodes can be constructed by mixing graphite (e.g., conductive graphite powders), which are commercially available with surface areas far exceeding 2400 meter$^2$ per gram, with the corresponding polymer electrolyte. The term graphite is intended to include graphene, a flat mono-layer of carbon atoms. Although the structure of the composite electrodes may reduce the effective surface area of the graphite, it can produce a balance between ionic and electronic conductive structures. It is expected that 20-40% of the particle surface area can still be available for redox plating and electrostatic charging. At modest graphite loadings per centimeter$^2$ of composite electrode, surface area enhancements of $10^4$ are expected.

In certain embodiments, the loading of conductive graphite powders in the graphite composite electrodes is high enough to achieve electrical conductivity, but not so high as to impede the dielectric access of ions to the conductive surfaces. In certain embodiments, graphite composite electrodes can include 17 to 50 volume percent conductive graphite powders.

Certain other embodiments disclosed herein include flat sheets of composite electrode to form energy storage device cells. The flat sheets of very thin cells forming the energy storage device can allow for versatility of shape and size of the device. In addition, the flat cells can allow for the use of a prismatic shape, or other shapes for the devices, to generate energy storage devices that are efficient in space and volume.

In particular exemplary embodiments, the thin, flat sheets can be laminated together to form a cell of the energy storage device. The particular processes of forming the materials and assembling the cells can allow for high speed automation, thus reducing the overall cost of manufacturing the devices. In. certain exemplary embodiments, the sheet material devices can be stacked in a prismatic, or other arrangement, that can allow for generation of energy storage devices having the ability to cycle and re-cycle with good power delivery.

Non-Electrically Conductive Dielectric Oil

The dielectric and composite electrode layers, prior to assembly, can be impregnated with an oil (e.g., a non-electrically conductive dielectric oil). The oil can be chosen from a group of small molecule oils that are known to have very high breakdown voltages and bulk resistances, along with modest dielectric constants. Such oils are typically used in high voltage transformers and switches as dielectric insulation to prevent arcing. One such example is polydimethylsiloxane such as that available under the trade designation CLEARCO STO-50 silicone transformer oil from Clearco Products Co., Inc., Bensalem, Pa. Such an oil impregnated into the electrolyte structure can be absorbed into the charge domains to displace, for example, any residual water, and increase the bulk electrical resistivity and ionic conductivity of the structure (e.g., act as an ion conductivity enhancer) and help to protect the structure from arcing or other breakdown phenomena. The oil can also act as a media for the transport of ions to the electrodes for oxidation or reduction.

Methods of Storing Energy

Energy storage devices having a solid multilayer electrolyte between a cathode and an anode can be initially charged in an electrochemical mode. Although the present disclosure can provide many configurations of energy storage devices having a solid multilayer electrolyte between a cathode and an anode, the following exemplary embodiments are further described herein.

Figure 5:
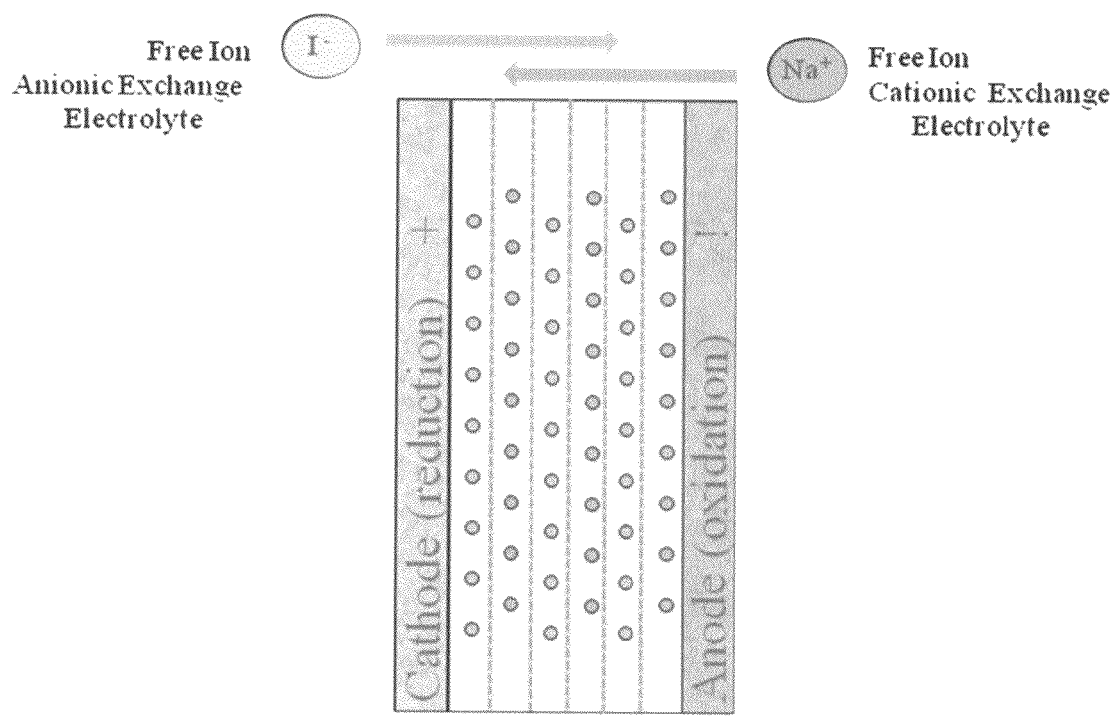
FIG. 5 is a schematic diagram illustrating the redox behavior observable when an exemplary energy storage device as described herein is charged.

In a first embodiment, referring to a device having composite electrodes and a solid multilayer electrolyte containing sodium and iodide ions as illustrated in FIG. 5, the initial behavior of the device is that of a sodium-iodide redox battery. The multilayer electrolyte is layered, with the sodium cationic exchange electrolyte alternating with the iodide anionic exchange electrolyte. The external electrical field applied to the anode and cathode causes the free ions to migrate through the electrolyte and plate the surface of the oppositely charged electrode. Electric polarization of polymers to create high permittivity structures has been described. See, for example, Pohl, *Journal of Electronic Materials,* July 1986, 15:201-203.

In some embodiments, this initial charging of the device will cause physical movement of the ions through the electrolyte until they are plated onto the electrodes. It is expected that the voltage necessary to polarize the dielectric may exceed 5 volts and that dielectric polarization may be slow due to the interfacial resistances at electrolyte layer boundaries. However, as long as the external voltage is maintained at this level or higher, the sodium and iodide ions will not be released back into the electrolyte. The resulting partially charged structure behaves like an electrostatic capacitor with a high permittivity solid multilayer dielectric. In certain embodiments, conditions sufficient to form the solid multilayer dielectric include applying a field having a potential (e.g., continuous potential) of at least 1 volt (e.g., direct current), and in certain embodiments at least 2 volts, at least 3 volts, at least 4 volts, or at least 5 volts (e.g., direct current).

Figure 6:
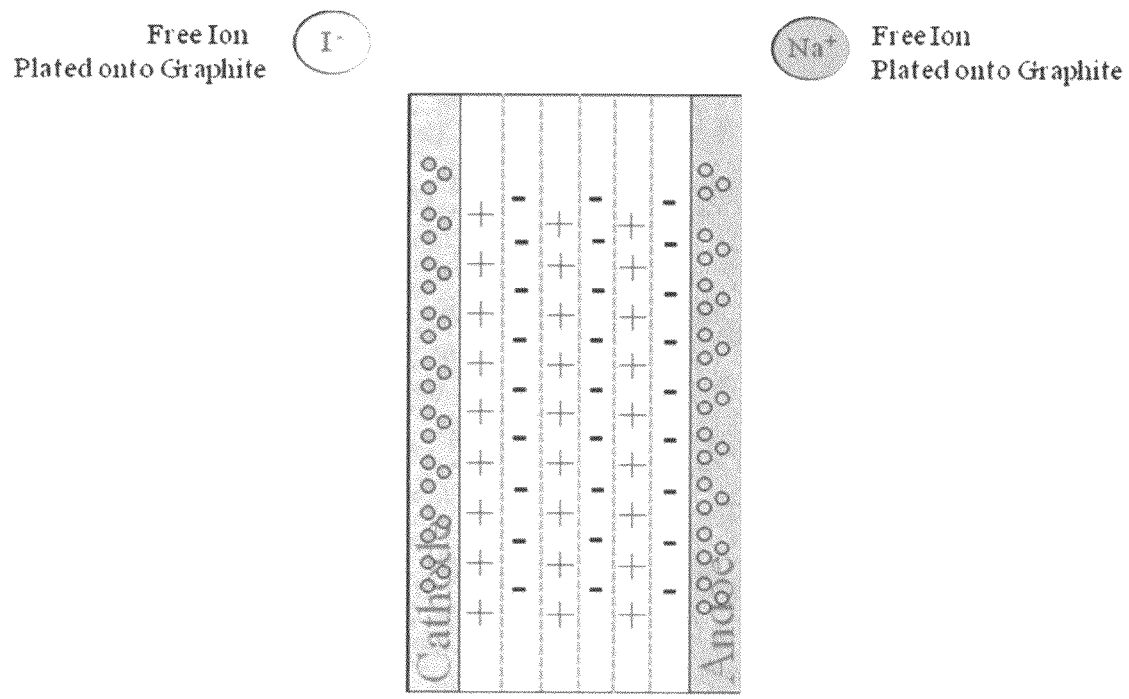
FIG. 6 is a schematic diagram illustrating the polarized dielectric behavior observable when a partially charged exemplary energy storage device as illustrated in FIG. 5 is further charged.

The resulting partially charged structure can behave like an electrostatic capacitor with a high permittivity multilayer dielectric including layers of the polarized electrolyte, as shown in FIG. 6. The device includes an anode; a solid multilayer dielectric, and a cathode. The multilayer dielectric includes alternating layers of one or more cationically polarized polymer layers and one or more anionically polarized polymer layers. At least one canonically polarized polymer layer includes a plurality of chemically bound positive ions, and at least one anionically polarized polymer layer includes a plurality of chemically bound negative ions. At least one cationically polarized polymer layer is adjacent the cathode and at least one anionically polarized polymer layer is adjacent the anode. In certain embodiments, the at least partially charged storage device can have a stored potential of at least 1 volt (e.g., direct current), and in certain embodiments at least 2 volts, at least 3 volts, at least 4 volts, or at least 5 volts (e.g., direct current). In certain embodiments, the at least partially charged storage device can have a stored potential of at most 500 volts (e.g., direct current).

The polymer electrolyte layers left behind when the sodium and iodide ions are plated onto the electrodes alternate between positively and negatively charged covalently bound ionic groups. Physically, these thin layers minimize the separation distance between charges, allowing them to effectively couple to the electrical fields from the externally applied electrical charge. This high permittivity increases the capacitance of the device in a manner similar to the liquid electrolyte in current EDLC capacitors. However, the polymer electrolytes are not limited by the low breakdown voltage of the organic solvents in EDLC capacitors, allowing certain embodiments of the energy storage devices disclosed herein to operate at much higher voltages and store significantly more energy, because energy storage depends on the voltage squared.

Figure 7:
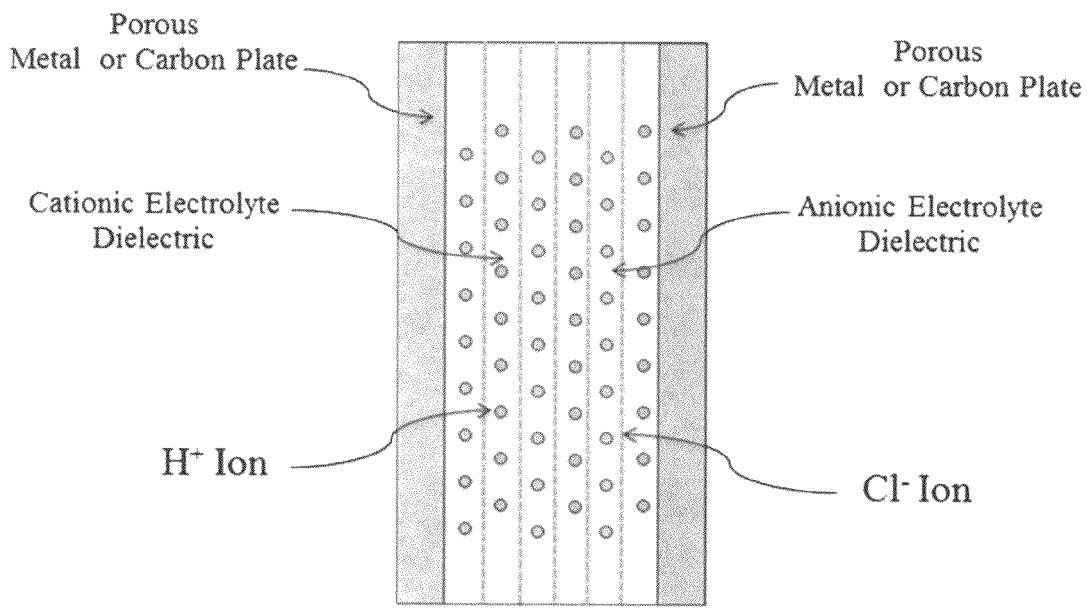
FIG. 7 is a schematic diagram illustrating an exemplary energy storage device.

In a second embodiment, referring to a device having porous metal or carbon plate electrodes and a solid multilayer electrolyte containing hydrogen and chloride ions as illustrated in FIG. 7, the initial behavior of the device is that of a redox battery. The multilayer electrolyte is layered, with the hydrogen cationic exchange electrolyte alternating with the chloride anionic exchange electrolyte. The mobile ion for the cationic electrolyte is a hydrogen proton ($H^+$). This ion has a smaller mass than the $Na^+$ ion described previously and a correspondingly higher drift velocity from an applied electric field. The mobile ion for the anionic electrolyte is the chlorine ion ($Cl^-$). It again has a smaller mass than the $I^-$ ion specified in the previous example and a higher drift velocity.

Figure 8:
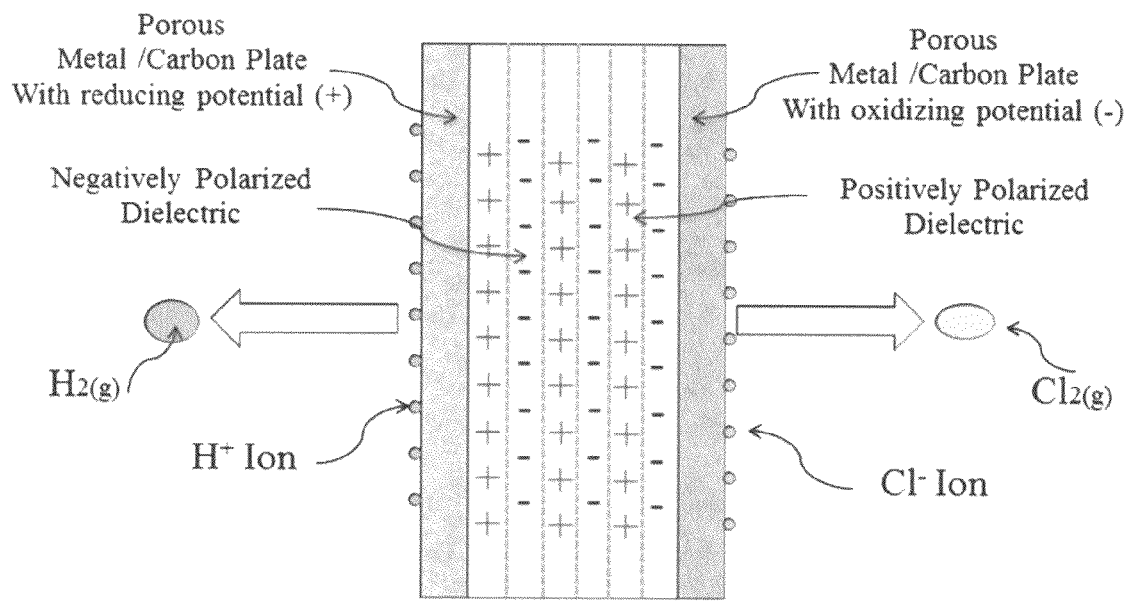
FIG. 8 is a schematic diagram illustrating the redox behavior observable when an exemplary energy storage device as illustrated in FIG. 7 is charged.

As illustrated in FIG. 8, the external electrical field applied to the anode and cathode causes the free ions to drift to the metal or carbon porous plates and be oxidized or reduced at the oppositely charged electrode to form gases ($H_2$ and $Cl_2$), which can be removed from the structure by vacuum. The removal of the mobile ions polarizes the layered dielectric between the plates. As the dielectric polarizes, its dielectric constant increases and the dielectric loss of the structure is reduced. Accordingly, there will be an internal electrical field between the layers placing them in compression Through electrostatic attraction. Electric polarization of polymers to create high permittivity structures has been described. See, for example, Pohl, *Journal of Electronic Materials*, July 1986, 15:201-203. It is expected that the voltage necessary to polarize the dielectric may exceed 5 volts and that dielectric polarization may be slow due to the interfacial resistances at electrolyte layer boundaries. The resulting partially charged structure behaves like an electrostatic capacitor with a high permittivity solid multilayer dielectric. In certain embodiments, conditions sufficient to form the solid multilayer dielectric include applying a field having a potential (e.g., continuous potential) of at least 1 volt (e.g., direct current), and in certain embodiments at least 2 volts, at least 3 volts, at least 4 volts, or at least 5 volts (e.g., direct current).

Figure 9:
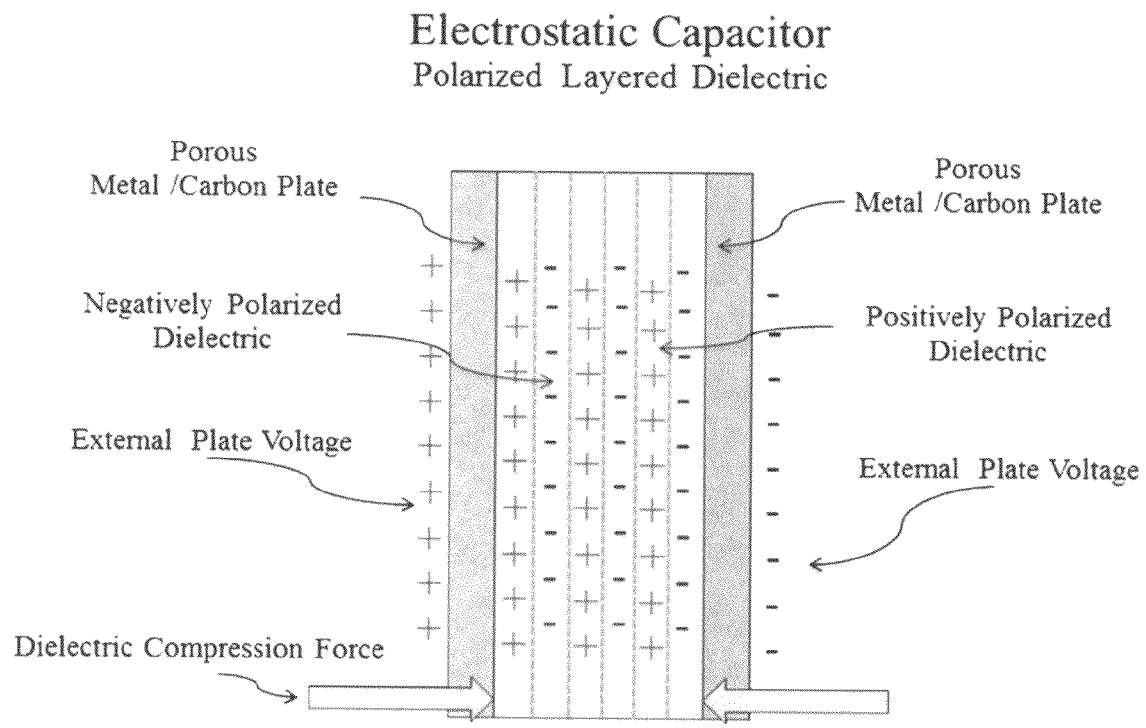
FIG. 9 is a schematic diagram illustrating the polarized dielectric behavior observable when a partially charged exemplary energy storage device as illustrated in FIG. 8 is further charged.

The resulting partially charged structure can behave like an electrostatic capacitor with a high permittivity multilayer dielectric including layers of the polarized electrolyte, as shown in FIG. 9. The device includes an anode; a solid multilayer dielectric, and a cathode. The multilayer dielectric includes alternating layers of one or more cationically polarized polymer layers and one or more anionically polarized polymer layers. At least one cationically polarized polymer layer includes a plurality of chemically bound positive ions, and at least one anionically polarized polymer layer includes a plurality of chemically bound negative ions. At least one cationically polarized polymer layer is adjacent the cathode and at least one anionically polarized polymer layer is adjacent the anode. In certain embodiments, the at least partially charged storage device can have a stored potential of at least 1 volt (e.g., direct current), and in certain embodiments at least 2 volts, at least 3 volts, at least 4 volts, or at least 5 volts (e.g., direct current). In certain embodiments, the at least partially charged storage device can have a stored potential of at most 500 volts (e.g., direct current).

The polymer electrolyte layers left behind when the hydrogen and chloride ions are oxidized or reduced at the electrodes and removed as gases, alternate between positively and negatively charged covalently bound ionic groups. As electric potential is applied to the plates, the imposed electric field will further compress the layers. The compressed dielectric will store electrical energy through the relationship of force x distance. Physically, these thin layers minimize the separation distance between charges, allowing them to effectively couple to the electrical fields from the externally applied electrical charge. This high permittivity increases the capacitance of the device in a manner similar to the liquid electrolyte in current EDLC capacitors. However, the polymer electrolytes are not limited by the low breakdown voltage of the organic solvents in EDLC capacitors, allowing certain embodiments of the energy storage devices disclosed herein to operate at much higher voltages and store significantly more energy, because energy storage depends on the voltage squared.

Conditions sufficient to store a charge on surfaces of the electrodes of the partially charged energy storage device include applying a field having a potential (e.g., continuous potential) of greater than 1 volt (e.g., direct current), and in certain embodiments greater than 2 volts, greater than 3 volts, greater than 4 volts, or greater than 5 volts (e.g., direct current). In certain embodiments, conditions sufficient to store a charge on surfaces of the electrodes of the partially charged energy storage device include applying a field having a potential (e.g., a continuous potential) of at most the breakdown voltage of the dielectric (e.g., 500 volts direct current). Operating voltages for the structure in electrostatic mode can range from, for example, 48 volts (e.g., direct current) to about half the dielectric break-down voltage. The dielectric in the polarized form can have breakdown voltages that exceed 120 volts/micron, because unpolarized samples were determined to have this capability. For some embodiments, an operating range in excess of 500 volts may be possible.

Cells/Systems

Figure 10:
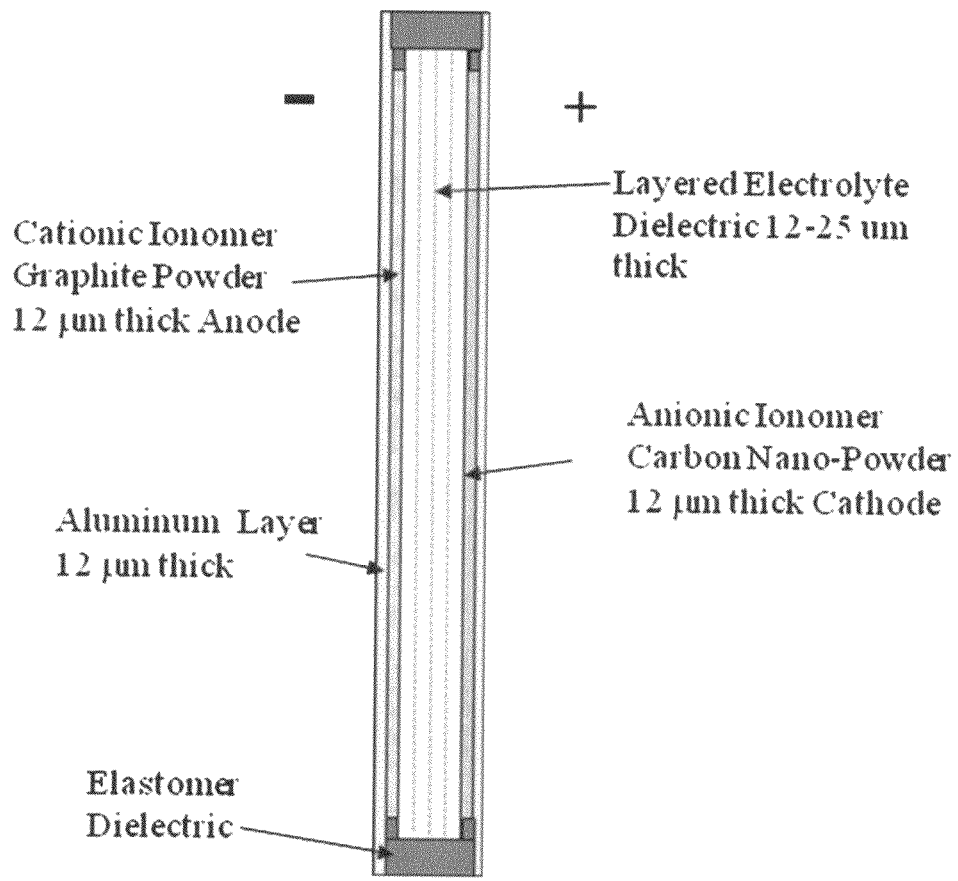
FIG. 10 is an illustration of an exemplary single cell energy storage device as described herein.

A schematic diagram of an exemplary cell and its structure is shown in FIG. 10. The cell includes aluminum outer layers (e.g., 12 micrometers thick) end capped with an elastomeric dielectric to encase a device including a composite anode (e.g., 12 micrometers thick), a multilayer electrolyte (e.g., 12-25 micrometers thick), and a composite cathode (e.g., 12 micrometers thick), to result in a cell having a total thickness of approximately 60-75 micrometers. Increasing the number of layers in the multilayer electrolyte or increasing the thickness of other layers can increase the total thickness of the cell up to, for example, 250 micrometers. While composite electrode layers can be more resistive than other electrodes, an aluminum outer coating can provide a highly conductive electrical path to the external load.

Figure 11:
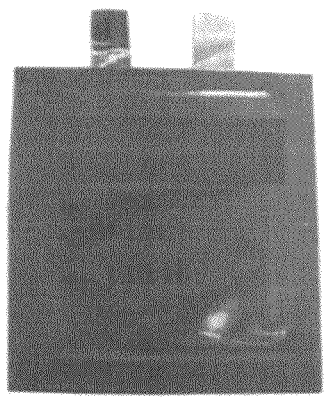
FIG. 11 is an illustration of an exemplary single cell energy storage device as described herein, packaged with plastic isolation and electrical connection tabs.

FIG. 11 is an illustration of an exemplary single cell energy storage device as described herein. The cell is packaged with plastic isolation and electrical connection tabs. Each cell can be encased in a plastic pouch and tabs can access the energy storage device cell within.

Figure 12:
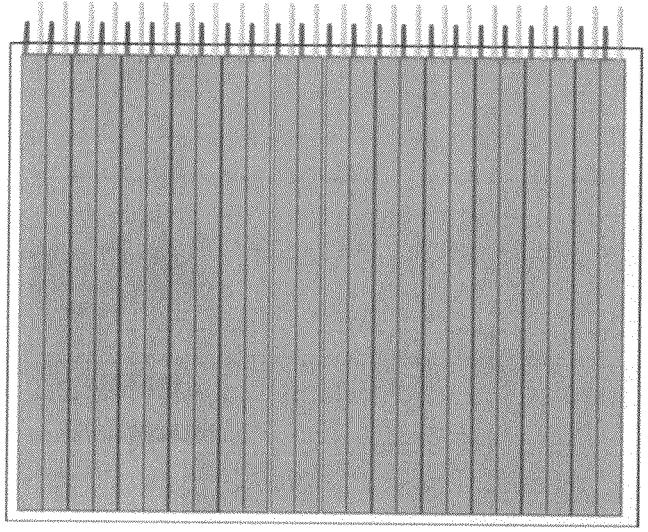
FIG. 12 is an illustration of an exemplary cell pack including a plurality of energy storage device cells as described herein.

Multiple cells can be connected in parallel, for example, by a bus accessing the tabs on each cell. FIG. 12 is an illustration of an exemplary cell pack including a plurality of energy storage device cells as described herein. Stacking these capacitors cells in a prismatic arrangement can allow for the creation of an energy storage device with superior specific energy, energy density, and specific power that retains typical capacitor cycling and round trip energy efficiency characteristics. In addition, packaging the cells in parallel can divide cell resistance to create a low equivalent series resistance cell pack. The charge levels of the cell pack can be monitored to reduce or prevent current inrush or discharge, which can reduce or prevent overheating of the assembly. Appropriate cooling methods can optionally be used for cell packs. Individual cells can be fused so as to reduce the chance of a pack meltdown in the event of shorts in one or more individual cells.

Figure 13:
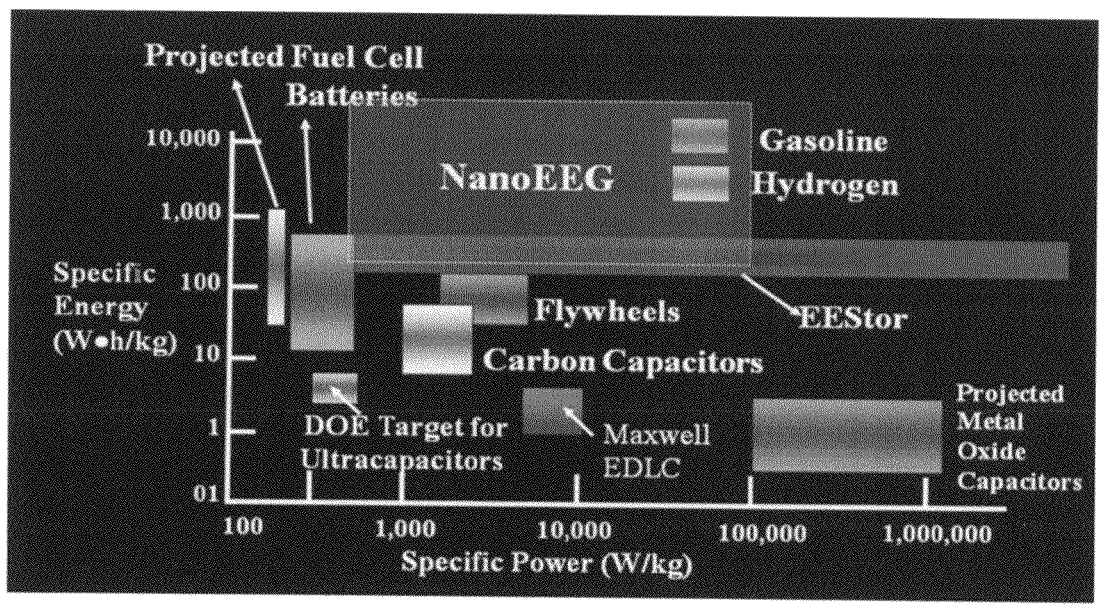
FIG. 13 is a graphical illustration of cell-level properties of various energy storage technologies.

FIG. 13 is a graphical illustration of cell-level properties of various energy storage technologies. It is expected that certain embodiments of energy storage devices as described herein can have functionality in the outlined area of the chart in FIG. 13. The exact functionality can depend on the permittivity of the dielectric and the properties of the electrodes (e.g., composite electrodes).

The complete disclosures of the patents, patent documents, and publications cited herein are incorporated by reference in their entirety as if each were individually incorporated. Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows.

What is claimed is:

1. A method of storing energy, the method comprising:
   providing an energy storage device comprising:
      an anode;
      a cathode; and
      a solid multilayer electrolyte disposed between the anode and the cathode and comprising a plurality of layers comprising anionic exchange polymer electrolyte layers and cationic exchange polymer electrolyte layers, wherein at least one anionic exchange polymer electrolyte layer comprises a polymer having a plurality of chemically bound positive ions and a plurality of electrostatically bound negative ions, and at least one cationic exchange polymer electrolyte layer comprises a polymer having a plurality of chemically bound negative ions and a plurality of electrostatically bound positive ions;

applying a field negatively polarized with respect to the cathode and positively polarized with respect to the anode under conditions sufficient to cause substantially all the electrostatically bound positive ions to migrate and be reduced and deposited on the cathode, and substantially all the electrostatically bound negative ions to migrate and be oxidized and deposited on the anode, wherein the residual chemically bound positive ions on the one or more anionic exchange polymer electrolyte layers and the residual chemically bound negative ions on the one or more cationic exchange polymer electrolyte layers form a solid multilayer dielectric comprising directly alternating polarized polymer layers; and further applying a field negatively polarized with respect to the cathode and positively polarized with respect to the anode under conditions sufficient to electrostatically store charge on surfaces of the electrodes.

2. The method of claim 1 wherein the solid multilayer electrolyte comprises directly alternating anionic exchange polymer electrolyte layers and cationic exchange polymer electrolyte layers, wherein at least one of the anionic exchange polymer electrolyte layers is adjacent the cathode and at least one of the cationic exchange polymer electrolyte layers is adjacent the anode.

3. The method of claim 1 wherein the anode, the cathode, or both comprise a porous metal or carbon plate.

4. The method of claim 1 wherein the anode comprises an anionic exchange polymer electrolyte and a plurality of graphite nanoparticles.

5. The method device of claim 1 wherein the cathode comprises a cationic exchange polymer electrolyte and a plurality of graphite nanoparticles.

6. The method of claim 1 wherein at least one of the anionic exchange polymer electrolyte layers comprises a chloride anionic exchange polymer, and wherein at least one of the cationic exchange polymer electrolyte layers comprises a hydrogen ion cationic exchange polymer.

7. The method of claim 6 further comprising a vacuum source configured to remove gases formed at one or more of the electrodes.

8. The method of claim 1 further comprising a non-electrically conductive polydimethylsiloxane dielectric oil at least partially within the solid multilayer electrolyte.

9. The method of claim 1 wherein the device is configured to be initially charged to store energy in an electrochemical mode, and wherein the device is configured to be further charged to store energy in an electrostatic mode.

10. The method of claim 1 wherein conditions sufficient to form the solid multilayer dielectric comprising directly alternating polarized polymer layers comprise applying a field having a potential of at least 1 volt direct current.

11. The method of claim 1 wherein conditions sufficient to store charge on surfaces of the electrodes comprise applying a field having a potential of greater than 1 volt direct current.

12. The method of claim 1 wherein conditions sufficient to store charge on surfaces of the electrodes comprise applying a field having a potential of no greater than the breakdown voltage of the dielectric.

13. A method of storing energy, the method comprising:
providing an energy storage device comprising:
an anode;
a cathode; and
a solid multilayer electrolyte disposed between the anode and the cathode and comprising a plurality of layers comprising anionic exchange polymer electrolyte layers and cationic exchange polymer electrolyte layers, wherein at least one anionic exchange polymer electrolyte layer comprises a polymer having a plurality of chemically bound positive ions and a plurality of electrostatically bound negative ions, and at least one cationic exchange polymer electrolyte layer comprises a polymer having a plurality of chemically bound negative ions and a plurality of electrostatically bound positive ions, and wherein at least one of the anionic exchange polymer electrolyte layers comprises a chloride anionic exchange polymer, and wherein at least one of the cationic exchange polymer electrolyte layers comprises a hydrogen ion cationic exchange polymer;

applying a field negatively polarized with respect to the cathode and positively polarized with respect to the anode under conditions sufficient to cause substantially all the electrostatically bound positive ions to migrate and be reduced at the cathode and removed as gas, and substantially all the electrostatically bound negative ions to migrate and be oxidized at the anode and removed as gas, wherein the residual chemically bound positive ions on the one or more anionic exchange polymer electrolyte layers and the residual chemically bound negative ions on the one or more cationic exchange polymer electrolyte layers form a solid multilayer dielectric comprising directly alternating polarized polymer layers; and further applying a field negatively polarized with respect to the cathode and positively polarized with respect to the anode under conditions sufficient to electrostatically store charge on surfaces of the electrodes.

14. The method of claim 13 wherein the gases formed from the reduction of the electrostatically bound positive ions and the oxidation of the electrostatically bound negative ions are removed under vacuum.

* * * * *

UNITED STATES PATENT AND TRADEMARK OFFICE
CERTIFICATE OF CORRECTION

| | | |
|---|---|---|
| PATENT NO. | : 9,013,155 B2 | Page 1 of 1 |
| APPLICATION NO. | : 13/544436 | |
| DATED | : April 21, 2015 | |
| INVENTOR(S) | : Ehrenberg | |

It is certified that error appears in the above-identified patent and that said Letters Patent is hereby corrected as shown below:

Title page

Item (63) Related U.S. Application Data
delete "PCT/US2011/002051, filed on Jan. 7, 2011"
and
insert --PCT/US2011/020514, filed on Jan. 7, 2011--

Signed and Sealed this
Twenty-second Day of March, 2016

Michelle K. Lee
*Director of the United States Patent and Trademark Office*